United States Patent
Schaefgen

(10) Patent No.: US 11,423,795 B2
(45) Date of Patent: Aug. 23, 2022

(54) COGNITIVE TRAINING UTILIZING INTERACTION SIMULATIONS TARGETING STIMULATION OF KEY COGNITIVE FUNCTIONS

(71) Applicant: CogReps Inc., Minneapolis, MN (US)

(72) Inventor: Matthew Pollard Schaefgen, Plymouth, MN (US)

(73) Assignee: CogReps Inc., Minneapolis, MN (US)

( * ) Notice: Subject to any disclaimer, the term of this patent is extended or adjusted under 35 U.S.C. 154(b) by 0 days.

(21) Appl. No.: 15/560,760

(22) PCT Filed: Mar. 25, 2016

(86) PCT No.: PCT/US2016/024231
§ 371 (c)(1),
(2) Date: Sep. 22, 2017

(87) PCT Pub. No.: WO2016/154543
PCT Pub. Date: Sep. 29, 2016

(65) Prior Publication Data
US 2018/0053436 A1     Feb. 22, 2018

Related U.S. Application Data

(60) Provisional application No. 62/138,741, filed on Mar. 26, 2015.

(51) Int. Cl.
*G09B 7/02*     (2006.01)
*G09B 19/00*     (2006.01)
(Continued)

(52) U.S. Cl.
CPC ............... *G09B 7/02* (2013.01); *A63B 69/00* (2013.01); *A63F 13/85* (2014.09);
(Continued)

(58) Field of Classification Search
CPC .......... G09B 7/02; G09B 6/065; G09B 5/125; G09B 19/00; G09B 19/0038; A63F 13/85; A63B 69/00; G06F 3/04847
See application file for complete search history.

(56) References Cited

U.S. PATENT DOCUMENTS 6,944,596 B1   9/2005   Gray et al.
2005/0239033 A1*   10/2005   Hatcher ................. G09B 19/00
434/350

(Continued)

FOREIGN PATENT DOCUMENTS

WO    WO 2012/148524 A1   11/2012

OTHER PUBLICATIONS

Search Report dated Jul. 24, 2018 for EP Application No. 16769773. 9, 8 pages.
(Continued)

*Primary Examiner* — Yingchuan Zhang
(74) *Attorney, Agent, or Firm* — Patterson Thuente Pedersen, P.A.

(57) ABSTRACT

A cognitive training and evaluation system capable of simulating a scenario to be executed by a trainee. The system includes a simulation server and one or more interface devices. The simulation server can include a data storage engine, a scenario generation engine, a scenario execution engine, and a feedback and analysis engine. The data storage engine can store a library of scenario scripts, which can be used by the scenario generation engine with one or more scenario generation parameters to produce a scenario for execution by the scenario execution engine. The scenario execution engine can be configured to execute the scenario by iteratively communicating a status to the interface device, and receiving a response from the interface device. Each interface device can render a simulation based on the one and communicate the response to the simulation server.

(Continued)

Trainee and opponent statistics can be used during scenario generation and execution.

14 Claims, 25 Drawing Sheets

(51) Int. Cl.
    *A63F 13/85*     (2014.01)
    *A63B 69/00*     (2006.01)
    *G06F 3/04847*     (2022.01)
    *G09B 5/06*     (2006.01)
    *G09B 5/12*     (2006.01)

(52) U.S. Cl.
    CPC ......... *G06F 3/04847* (2013.01); *G09B 5/065* (2013.01); *G09B 5/125* (2013.01); *G09B 19/00* (2013.01); *G09B 19/0038* (2013.01); *A63B 2243/007* (2013.01)

(56) References Cited

U.S. PATENT DOCUMENTS

| | | | |
|---|---|---|---|
| 2006/0073449 A1* | 4/2006 | Kumar | F41A 33/00 |
| | | | 434/219 |
| 2006/0247808 A1 | 11/2006 | Robb | |
| 2006/0281061 A1* | 12/2006 | Hightower | G09B 9/00 |
| | | | 434/247 |
| 2008/0254426 A1 | 10/2008 | Cohen | |
| 2010/0190143 A1 | 7/2010 | Gal et al. | |
| 2013/0330693 A1* | 12/2013 | Sada | G09B 19/0038 |
| | | | 434/236 |

OTHER PUBLICATIONS

Written Opinion and International Search Report for International Application No. PCT/US2016/024231 dated Aug. 6, 2016.
Communication dated Jul. 26, 2019 for EP Application No. 16769773.9, 5 pages.
Summons to attend oral proceeding pursuant to Rule 115(1) EPC dated Nov. 5, 2020, for EP Application No. 16769773.9, 8 pages.

* cited by examiner

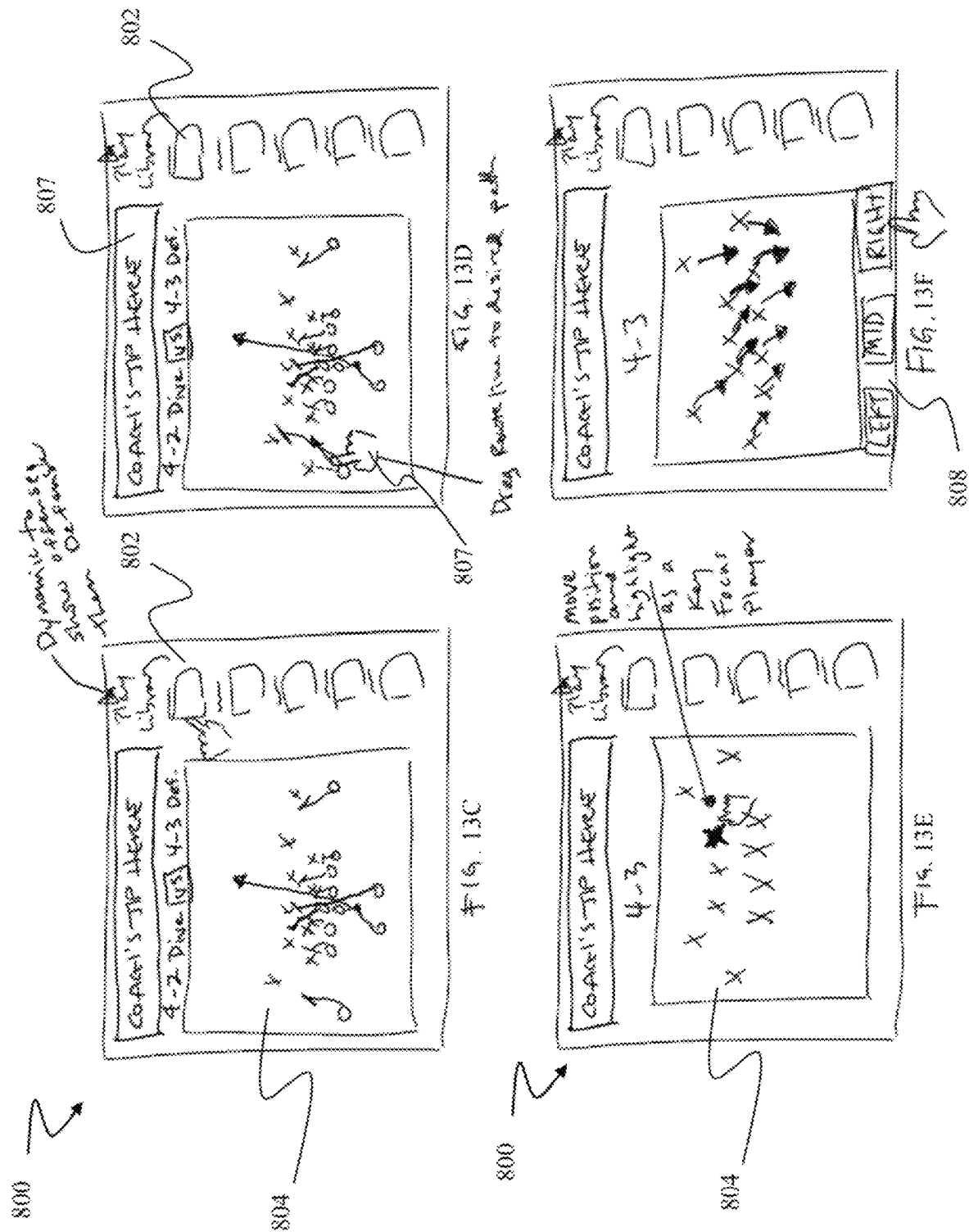

COGNITIVE TRAINING UTILIZING INTERACTION SIMULATIONS TARGETING STIMULATION OF KEY COGNITIVE FUNCTIONS

CROSS-REFERENCE TO RELATED APPLICATION

This application claims priority to U.S. Provisional Patent Application No. 62/138,711 filed Mar. 26, 2015, which is incorporated in its entirety herein.

The present application in a National Phase entry of PCT Application No. PCT/US2016/024231, filed Mar. 25, 2016, which claims priority to U.S. Provisional Application No. 62/138,741 filed Mar. 26, 2015, all of said applications being hereby incorporated by reference in their entirety.

TECHNICAL FIELD

In general, embodiments are directed to cognitive training utilizing interactive simulations to target stimulation of key cognitive functions, and more particularly, cognitive training utilizing interactive simulation software specially designed to mentally prepare athletes or other individuals by targeting stimulation of key cognitive functions.

BACKGROUND

Training and practice is a necessary in order to improve performance in many endeavors, including participating in sports. In particular, it is necessary for individuals and teams to learn and be able to execute standard scenarios in performance situations, such as a game.

Conventionally, individuals can learn certain behaviors or responses via practices or rote memorization. Trainees can also have their performance evaluated during practices with coaches. It is desirable however, to provide a more independent training and evaluation system that allows trainees to repeatedly practice under controlled conditions and allows trainers or coaches to develop scenarios to drive the desired learning.

SUMMARY

The present disclosure is directed to a cognitive training and evaluation system capable of simulating a scenario to be executed by one or more trainees. The system includes a simulation server and one or more interface devices. The one or more interface devices may be implemented on the same hardware as the simulation server, or may be in networked communication with each other.

The simulation server can include a data storage engine, a scenario generation engine, a scenario execution engine, and a feedback and analysis engine. The data storage engine can store a library of scenario scripts, which can be used by the scenario generation engine with one or more scenario generation parameters to produce a scenario for execution by the scenario execution engine. The scenario can include one or more opponent avatars or agents, for example, with which the trainee interacts to hone a cognitive skill or skills.

The scenario execution engine can be configured to execute the scenario by determining a status based on the one or more initial actions, communicating the status to the interface device, receiving a response from the interface device, determining a reaction and an updated status, and communicating the update status to the interface device.

Each interface device can iteratively receive one or more statuses from the simulation server, render a simulation based on the one or more statuses, receiving a response from the one or more trainees, and communicate the response to the simulation server.

In embodiments, the data storage engine can store the responses from the trainees, which can be used by a feedback and analysis engine to provide statistics and reports to the user. In embodiments, the data storage engine can also store profiles of the one or more opponent avatars created by the trainer, trainee, or generated and/or updated dynamically using real-time statistics generated by a person on whom the avatar is based.

In embodiments, the data storage engine can store user information such as usernames, passwords, profiles, access privileges, payment information, or any of a variety of user information and combinations thereof.

In embodiments, the data storage engine can store data related to opponent reactions of the opponent avatars, and the scenario execution engine can determine reactions based on the opponent data. In addition, pre-loaded or pre-generated opponent statistics can also be stored and optionally dynamically updated based on the opponent's performance of related activities in real life. For example, the trainee can comprise a quarterback in American football, and an opponent can comprise a defensive end. The opponent avatar's reactions in certain scenarios are based on statistics generated by the defensive end in related scenarios in real football games. The opponent avatar's reactions can be dynamically updated based on real-time statistics generated by the opponent. Additionally or alternatively, the opponent avatar's reactions can be updated based on the trainee's responses, such that the opponent avatar can adapt to the trainee's skill level.

In embodiments, the data storage engine can store data related to trainee specific competency measures, and the scenario execution engine can determine reactions based upon the trainee specific competency measures.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 13A-13F depict a graphical user interface for a coach's login sequence and management, according to an embodiment.

Figure 1:
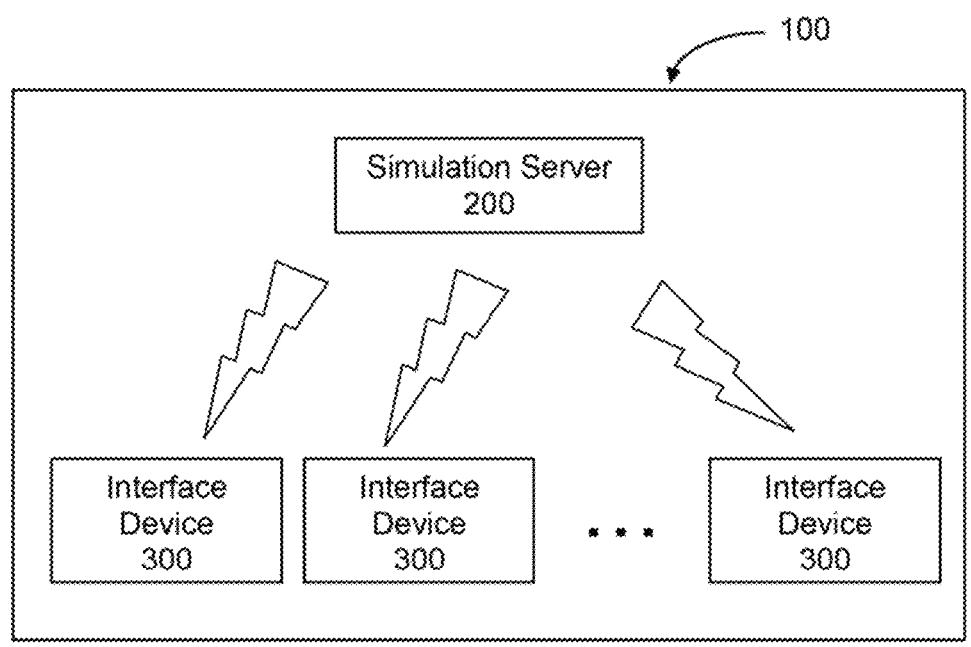
FIGS. 1 and 1A are block diagrams depicting a simulation system according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Embodiments of the present disclosure relate to systems and methods for executing an interactive simulation designed to mentally prepare athletes or other trainees by targeting stimulation of key cognitive functions. As will be described in further detail below, the system can provide trainees with various simulated scenarios in order to test and improve performance.

Some of the concepts described herein are specific to cognitive training of athletes in sports, such as, for example, football, basketball, soccer, baseball, or any of a variety of individual or team sports. However, it is appreciated that cognitive training can be used for any of a variety of non-sport or non-athletic applications, such as, for example, for targeting specific cognitive and neurological functions for treatment of a variety of conditions, such as, for example, ADHD, anxiety, and the like.

As shown in FIG. 1, a simulation system 100 can comprise simulation server 200 and one or more interface devices 300 in communication with server 200 for executing the simulation or cognitive training module. The simulation or module can be executed on device 300 by a mobile application, web page, downloaded program or game, or any of a variety of modules.

In embodiments, simulation server 200 can be a cloud-based server, accessible by interface devices 300 via an Internet or other network connection. Server 200 can comprise a database server, game server, application server, web server, or combination thereof. In embodiments, simulation server 200 and interface devices 300 can be present on a single computing device such that no network connection is required. In embodiments, the structure and functionality of simulation server 200 may be present on both a local and remote device allowing both online and offline access to the simulation system 100.

In embodiments, where simulation server 200 is cloud based, the need for software installation or maintenance on a user's device can be minimized or eliminated. In embodiments, the simulation system 100, or modules thereof, may be available on a recordable medium (such as DVD, CD-ROM, flash drive, floppy disk, or other recordable medium) or available online for downloading or installing on a device such as a PC, such that once installed, no internet or network connection is required.

Figure 1A:
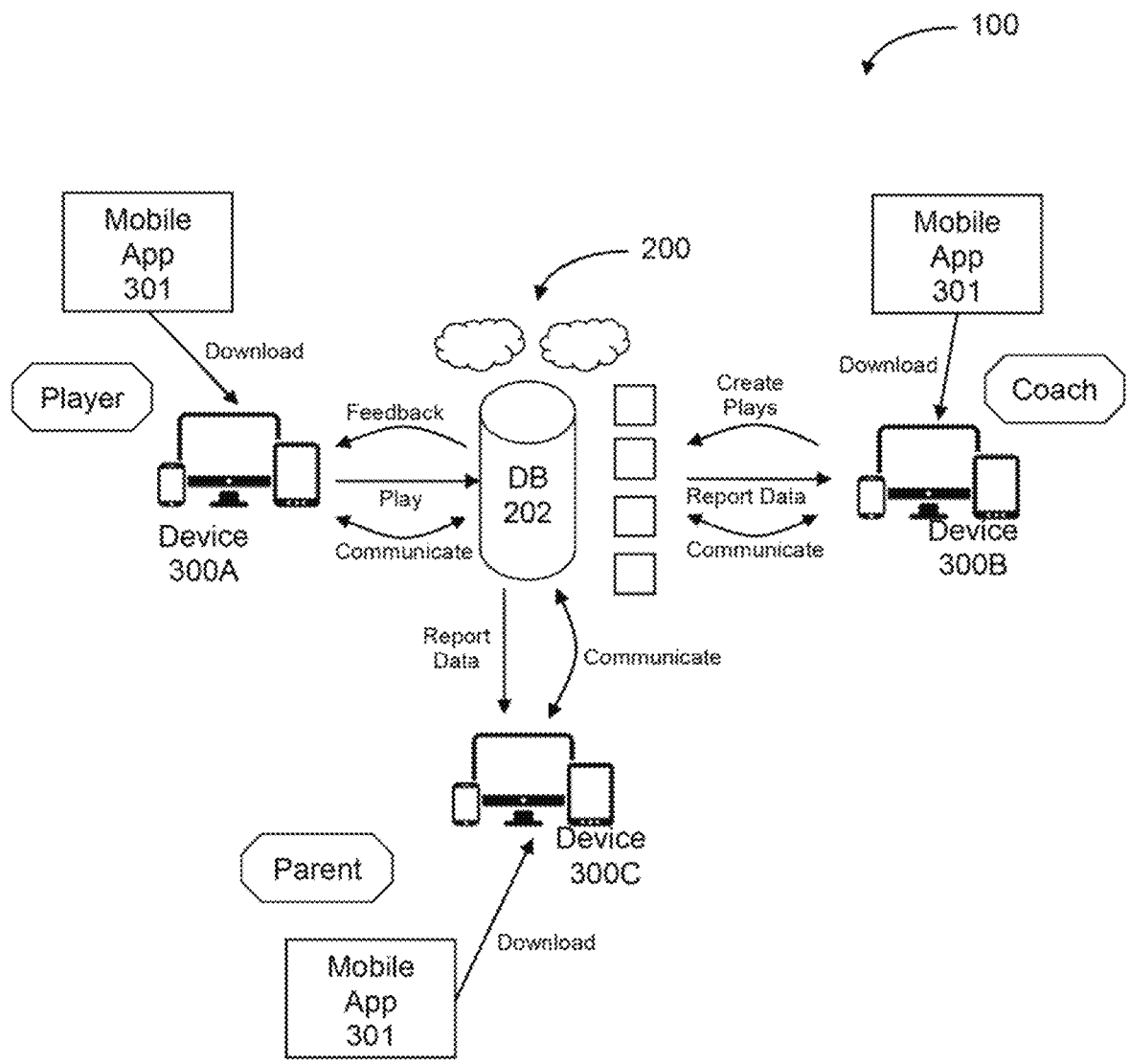

Referring to FIG. 1A, in a particular embodiment, system 100 includes server 200 having one or more data storage engines 202 thereon. Server 200 can be cloud-based, as described above. A plurality of remote user devices 300A-300C, which will be described in more detail below, communicate with server 200. Each device 300 includes a mobile application 301, either downloaded to or streamed via device 300, for executing the cognitive training module or simulation.

In this exemplary embodiment, application 301 is downloaded on each of three devices 300A-300C. Application 301 can be accessed on devices 300A-300C by individuals in different capacities, for which different access settings are configured. For example, device 300A is accessed by a trainee, such as a player, and communicates with server 200 to execute and perform in the training module, and the trainee's performance data is communicated back to server 200 for storage. Server 200 provides feedback regarding performance and other metrics, as described in more detail below. Examples of a trainee's user interface and point of view are depicted in the storyboards of FIGS. 8A-12R.

Device 300B is then accessed by a coach, who communicates with server 200 to set up various scenarios for execution by the trainee, to receive data of the trainee's performance, and other tasks. Examples of a coach's user interface and point of view are depicted in the storyboards of FIGS. 13A-14M. Device 300C can then be accessed by yet another individual, such as another player, a scout, a parent, or any of a variety of roles to access the training module, receive and/or report performance data.

Figure 2:
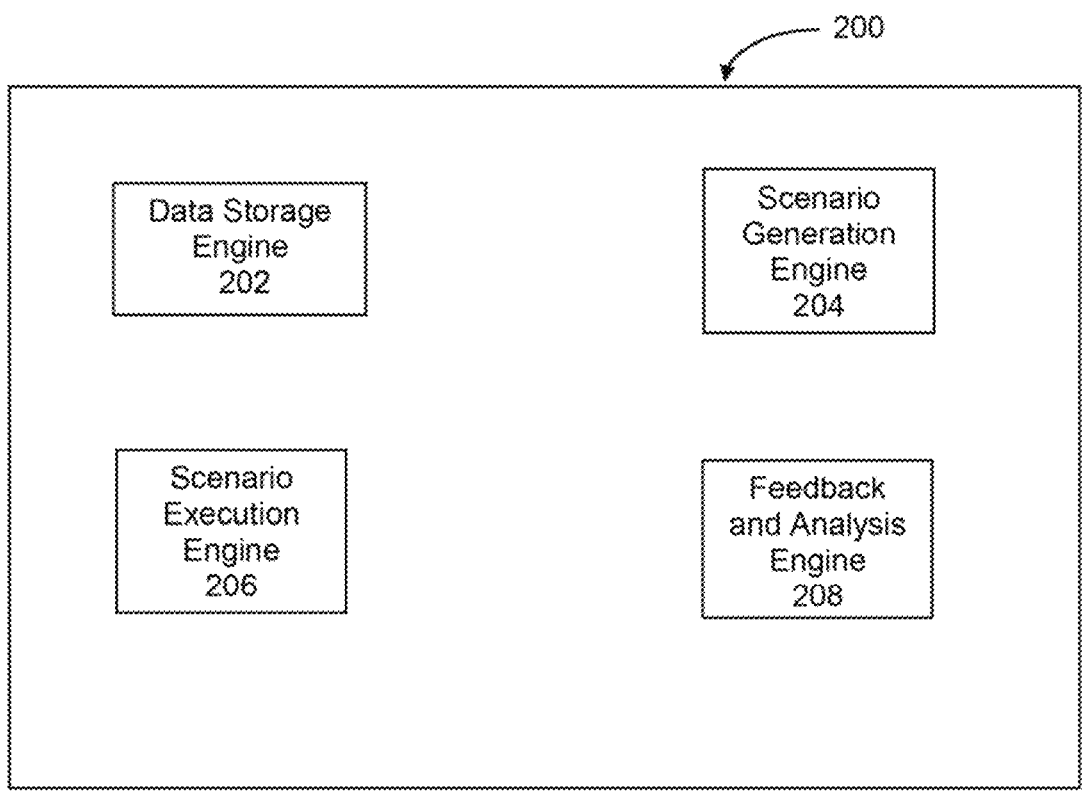
FIG. 2 is a block diagram depicting modules of a simulation server according to an embodiment.

Referring now to FIG. 2, various components of a simulation server 200 according to one embodiment are depicted. Simulation server 200 can include a data storage engine 202, scenario generation engine 204, scenario execution engine 206, and feedback and analysis engine 208. Each of the engines of simulation server 200 can be implemented in hardware, software, or a combination of both. Each of the engines of simulation server 200 can exist in single or multiple instances, and can be executed on a single, or multiple computing platforms.

Figure 3:
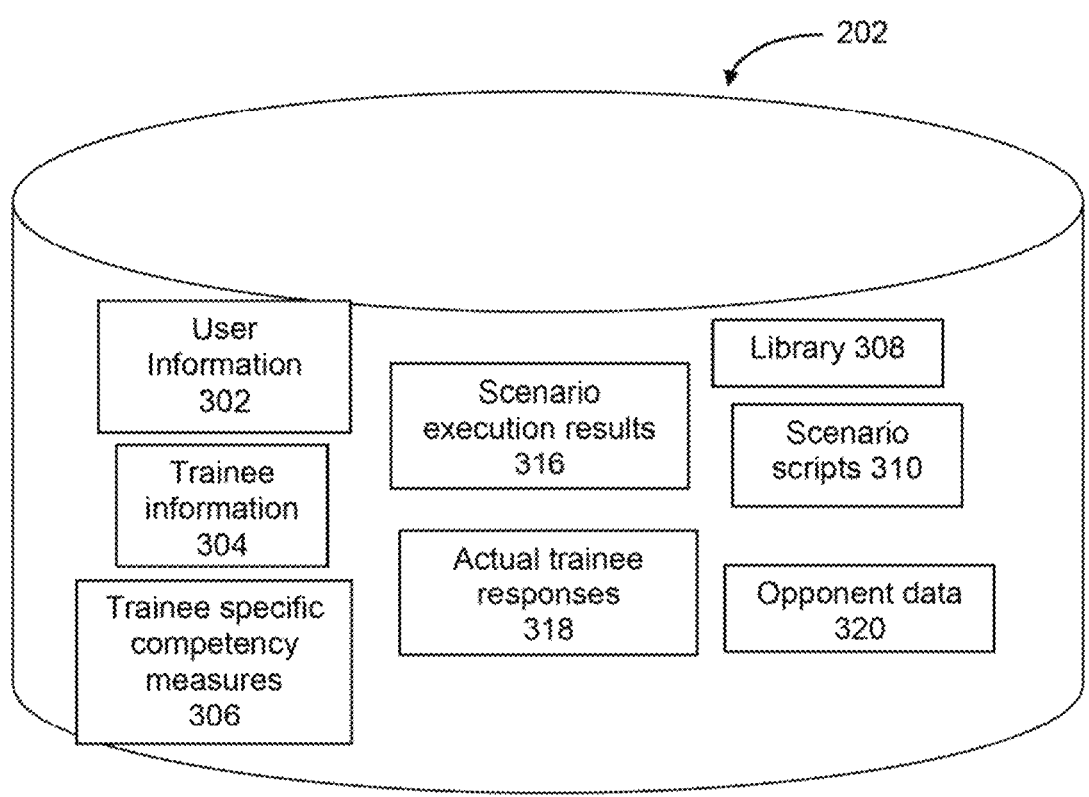
FIG. 3 is a block diagram depicting data items that can be stored by a data storage engine according to an embodiment.

Referring now to FIG. 3, data storage engine 202 can provide data storage and retrieval functionality for the other engines of simulation server 200. Data storage engine 202 can be a centralized database, or can be distributed across the instances of the various engines. Data storage engine 202 can provide storage for user information 302, including, for example user names, passwords, and privileges. Users of simulation system 100 can be trainees, or trainers (for example, players or coaches).

In embodiments, access to elements stored in data storage engine 202 can be restricted based on the user type (as described above with respect to FIG. 1A), or based on access restrictions provided by users. In embodiments, users can gain access to restricted material by entering an appropriate authorization code.

Data storage engine 202 can also provide storage for trainee information 304. Trainee information 304 can include trainee specific competency measures 306.

Data storage engine 202 can also provide storage for one or more libraries 308. Library 308 can include scripts 310 for scenarios 402 (discussed regarding FIG. 4 below). In embodiments, trainers may choose to only allow certain trainees access to each of the one or more libraries.

Data storage engine 202 can also store the scenario execution results 316, including trainee identification, and actual trainee responses 318.

Data storage engine 202 can also store opponent data 320, such as probabilities of opponents taking certain actions in response to actual trainee responses 318, real time statistics of actions taken in response to real-life responses, or any of a variety of data with respect to the opponent (height, weight, build, speed, gender, etc.).

Figure 4:
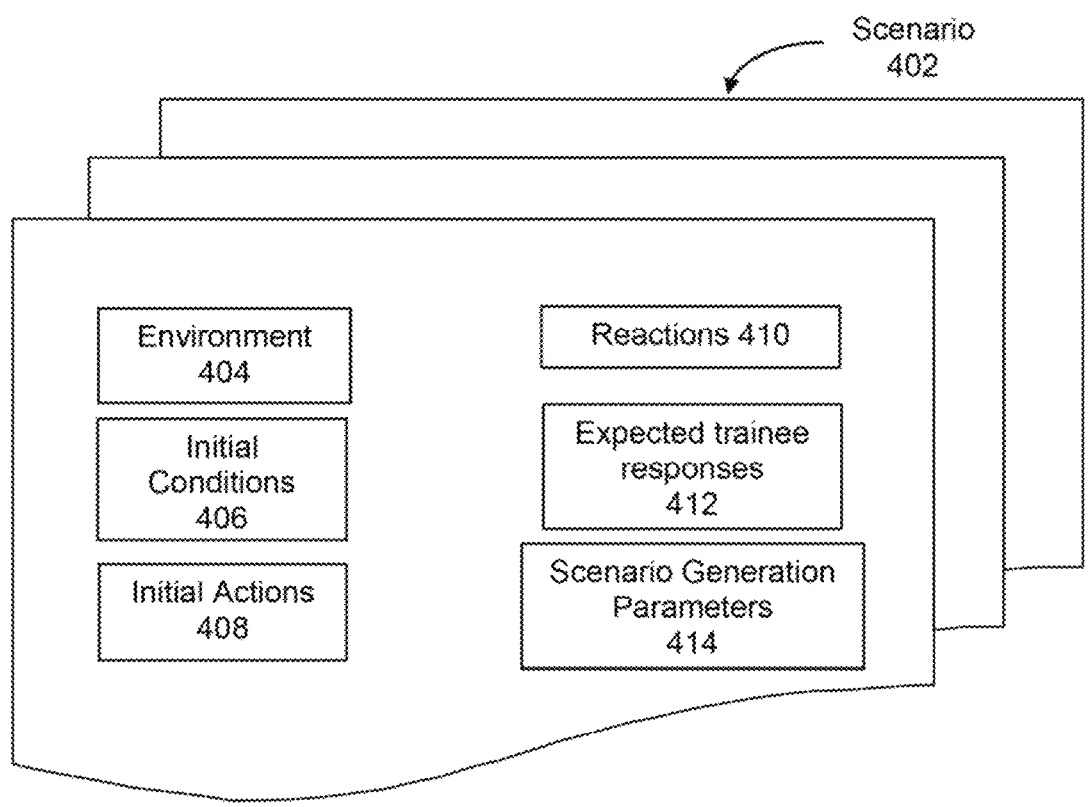
FIG. 4 is a block diagram depicting data elements of a scenario, according to an embodiment.

Referring now to FIG. 4, scenario generation engine 204 can generate scenarios 402 to be carried out by one or more trainees. Each scenario 402 can be based on a script 310 and can include an environment 404 (example environments include a football field, classroom, or battlefield), initial conditions 406 (which can include the number of players, locations of any obstacles, or timing details), one or more initial actions 408 to be performed by the simulations, one or more expected trainee responses 412, and one or more reactions 410 to be performed by the simulation in response to actual trainee responses 318 received.

Scenarios 402 can also include knowledge testing or cognitive training items. For example, during the scenario execution, strategically placed "symbols" can be displayed via interface devices 300 specific intervals. After the primary scenario 402 is completed, the user can be then tested on the symbols that were displayed through simple questions that they must answer via interface devices 300. Knowledge testing can also include questions related to elements of the scenario (for example, play formations for both offense and defense). Answers to knowledge testing questions can be stored as actual trainee responses 318 by data storage engine 202. Knowledge testing can also include questions related to decision-making, based on the scenario and actual trainee responses 318 chosen by the player. These selected responses to these questions can be used to test the player after the play completes, and these answers can be used in the logic created to determine the player's progress on the selected scenario.

Scenario generation engine 204 can generate scenarios 402 based on the library 308, opponent data 320, trainee specific competency measures 306, and/or scenario generation parameters 414 which can be provided by one or more users via one or more interface devices 300.

Figure 5:
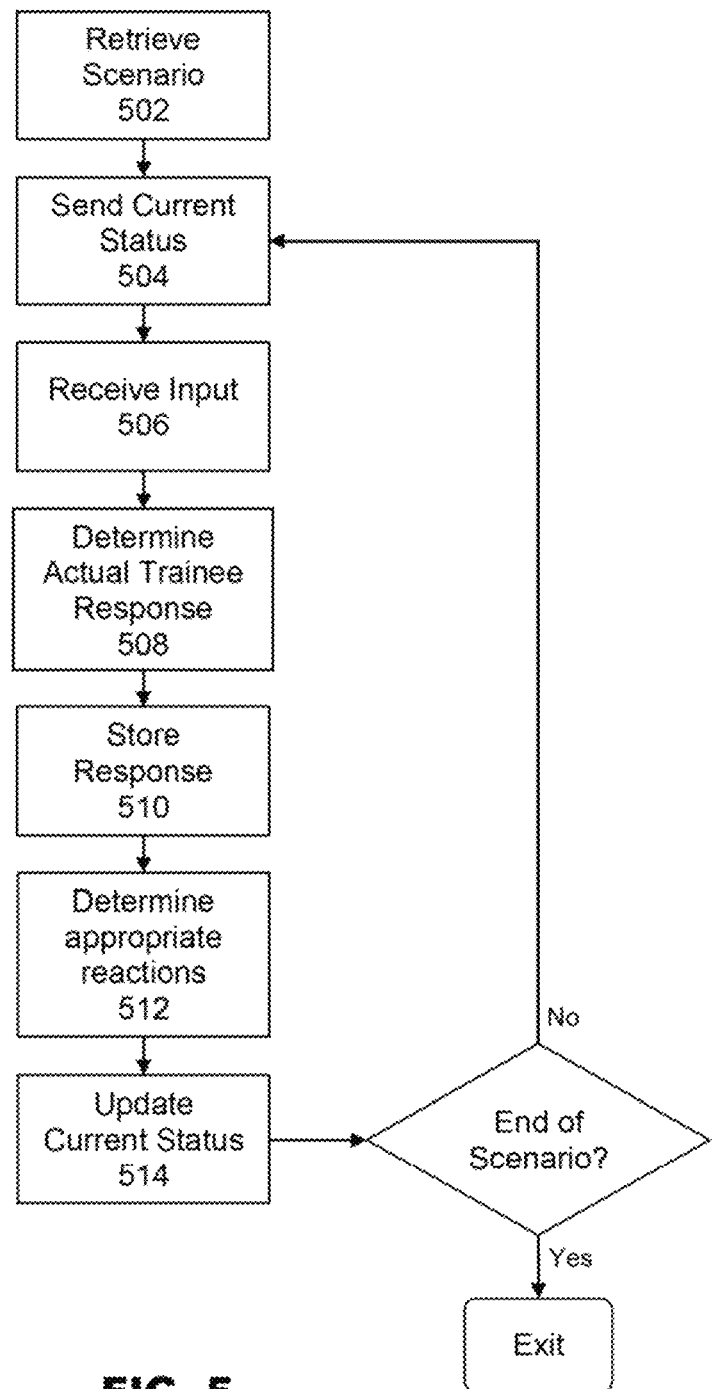
FIG. 5 is flowchart depicting operation of a scenario execution engine, according to an embodiment.

Referring now to FIG. 5, scenario execution engine 206 can present generated scenarios 402 to one or more trainees via one or more interface devices 300. For each scenario 402, scenario execution engine 206 can retrieve the scenario at 502, send a current status for rendering on one or more interface devices 300 at 504, receive input from the one or more interface devices 300 at 506, determine actual trainee responses 318 at 508, store responses 318 at 510, determine appropriate reactions 410 in response to actual trainee responses 318 at 512, update the current status at 514, and return to 504 to send the current status to interface devices 300. Scenario execution engine can repeat this cycle until the defined end of scenario 402, or until cancelled by a user.

In embodiments, elements of scenario 402, such as environment 404, initial conditions 406, initial actions 408 and reactions 410 can be randomized by scenario execution engine 206 while the scenario 402 is running. For example, actual trainee responses 318 may involve choices that have a less than 100% chance of success. In these cases, scenario execution engine 206 may determine that a given actual trainee response 318 is successful only a certain percentage of the time.

Feedback and analysis engine 208 can provide data to users based on scenario execution results 316. Feedback and analysis engine can provide data during scenario execution, or before or after scenario execution in order to allow users to customize scenario parameters. Feedback and analysis engine can compare actual trainee responses 318 to expected trainee responses 314 in order to determine trainee specific competency measures 306. Feedback and analysis engine can allow playback of any scenario based on the scenario script 312, actual trainee responses 318, and scenario execution results 316.

Figure 6:
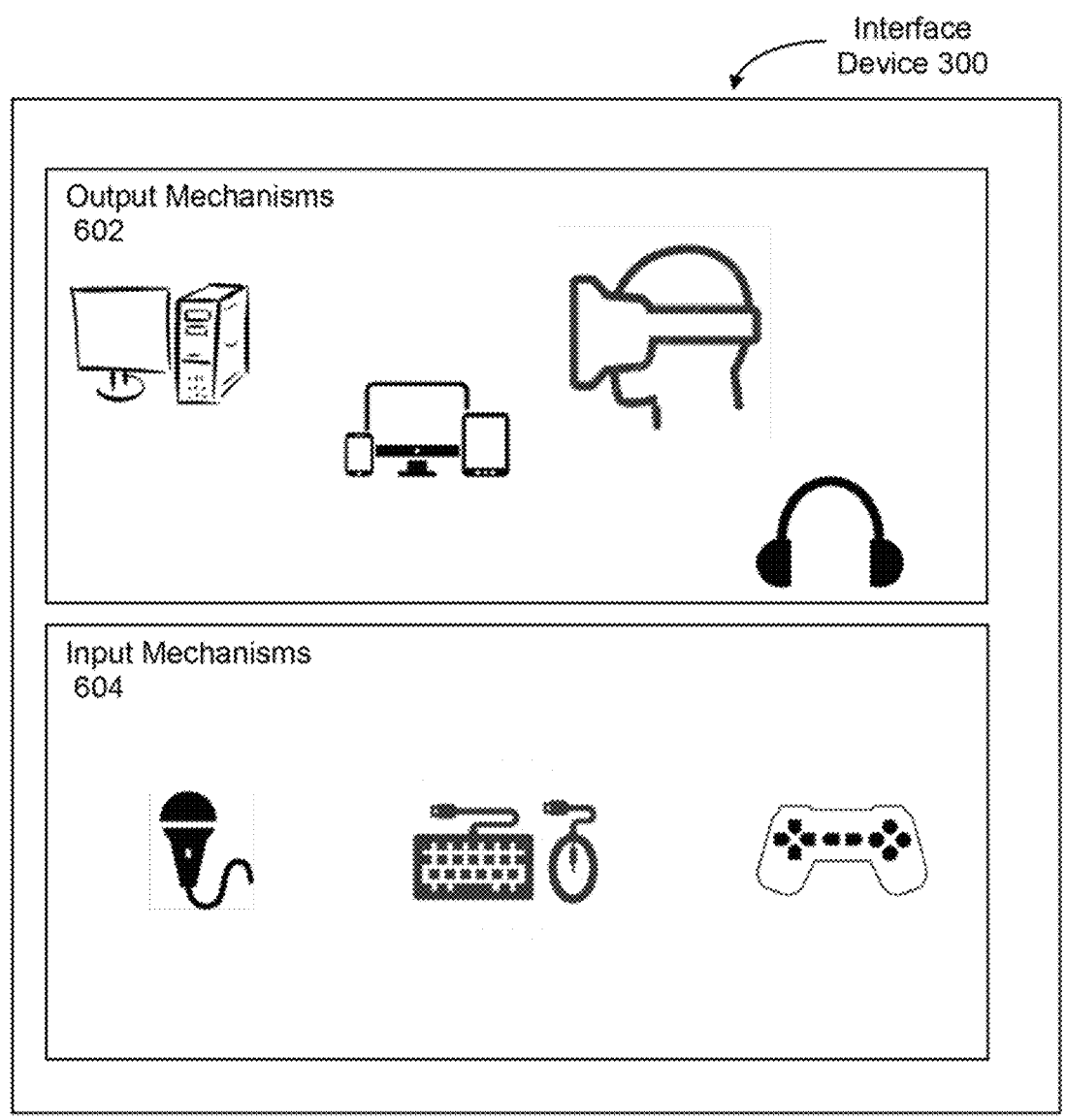
FIG. 6 is a block diagram depicting possible inputs and outputs of an interface device according to an embodiment.

Turning now to FIG. 6, interface devices 300 can allow one or more users to interact with simulation server 200. Interface devices 300 can comprise hardware, software, or a combination thereof capable of providing visual, auditory, and/or haptic output to a user and receiving input from a user. As such, interface devices 300 can comprise web applications, and/or native applications capable of executing on personal computers or mobile devices such as phones or tablets. Interface devices 300 can also include display devices associated with virtual reality hardware such as, for example, Oculus Rift, Samsung Gear VR, Microsoft HoloLens, Sony PlayStation VR, Google Cardboard or Glass, FOVE VR, 360fly FlyView Mobile VR viewer, Merge 3680, Zeiss VR ONE, HTC Vive, Avegant Glyph, Durovis Dive, or combinations thereof.

Interface devices 300 can comprise one or more output mechanisms 602. These can include visual outputs, which, in embodiments could be computer monitors, mobile devices or tablets, televisions, display devices associated with virtual reality hardware or three-dimensional (3D) displays. Output mechanisms 602 can also comprise one or more auditory outputs, which, in embodiments could be speakers or headphones. Output mechanisms 602 can also comprise one or more haptic outputs, which can include vibration functions on mobile devices, wearables (e.g. smart watches), peripherals, keyboards, or controllers.

Interface devices 300 can also comprise one or more input mechanisms 604 for controlling the trainee's on-screen avatar. These can include keyboards, touch-screens (with or without a stylus), computer mice or track pads, and/or or game controllers. Input mechanisms 604 can also include auditory input devices such as microphones, or visual input devices such as cameras. Other embodiments may include input devices such as motion-sensing input devices and/or pressure sensitive devices along the lines of the Nintendo Wii balance board.

In one example, input mechanism can comprise the user's fingers or stylus. In this embodiment, controlling the user's on-screen avatar can include tapping the screen (such as a resistive or capacitive screen) with the point of a finger or appropriate stylus. In another embodiment, touch-screen control can be accomplished using a finger in front of, on top, or slightly behind the on-screen avatar to control the movement of the avatar. In this embodiment, dragging the finger across the screen moves the avatar across the screen in a similar path. In another embodiment, user control areas are located on the user interface screen, such as in a designated corner of the screen or device, and the user's fingers/thumbs act as controls when moved within the designated areas in a designated fashion or combination thereof (e.g. track pad). In yet another embodiment, input mechanism 604 comprises a peripheral device such as, but not limited to, a handheld smart device such as a phone or tablet, a computer device coupled to the interface, commercially available controllers/input devices associated with gaming consoles (e.g. Microsoft Kinect, Nintendo Wii or Wii U, Microsoft Xbox One or Xbox 360, Sony PlayStation 4, Mad Catz L.Y.N.X. or M.O.J.O., NVIDIA SHIELD, 8Bitdo Non-MFi, and the like or combinations thereof). In yet another embodiment, input mechanism 604 comprises virtual reality devices such as those listed above.

In embodiments, interface devices 300 can process inputs from input mechanisms 604 in order to determine actual trainee responses 318 or other input data. For example, interface devices 300 can interpret certain key presses on a keyboard to denote actions, or use mouse movements/clicks or touchscreen presses to determine that a trainee wants to move to a specific place or perform a certain action. In addition, interface devices 300 can process auditory input to provide voice recognition of play-calling or other group communication that could drive user experience. Interface devices 300 can also process trainee movement via cameras or other visual input devices, including pressure sensing devices. Interface devices 300 can also detect movement of trainee's head or eyes in order to detect trainee's intentions.

Figure 7:
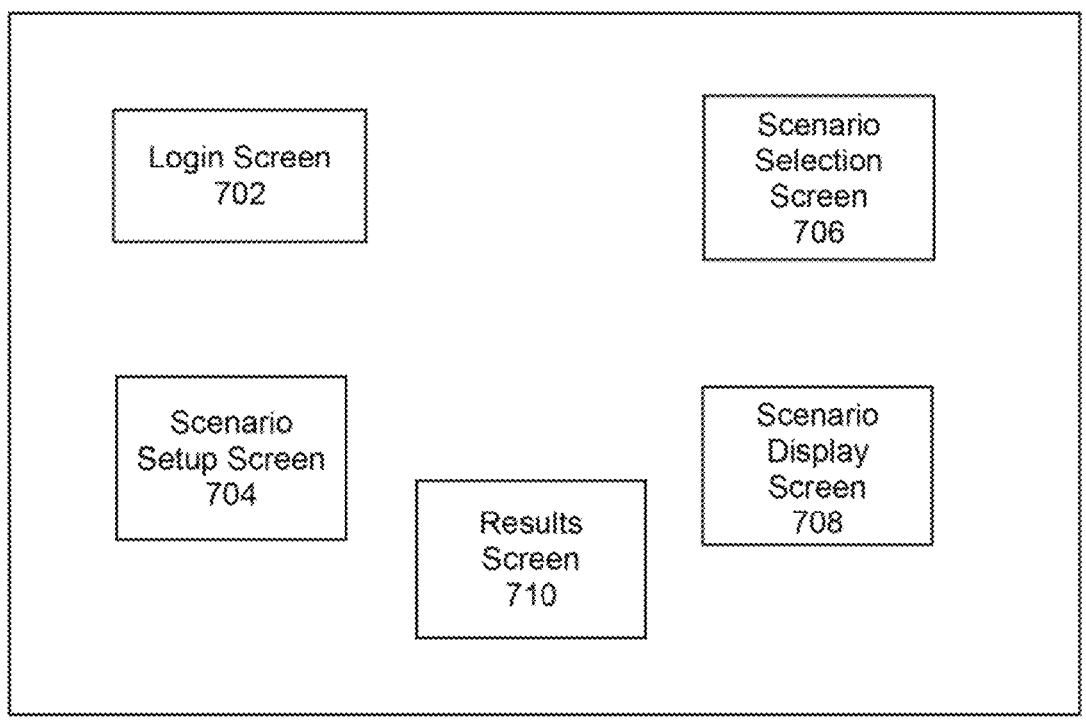
FIG. 7 is a block diagram depicting possible screens implemented on an interface device according to an embodiment.
Figure 8A:
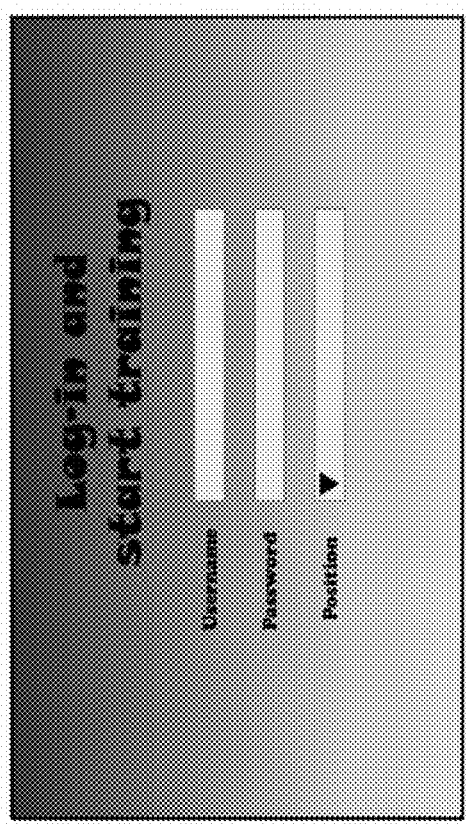
FIGS. 8A-8C depict a graphical user interface for player creation and login screens, according to an embodiment.
Figure 8B:
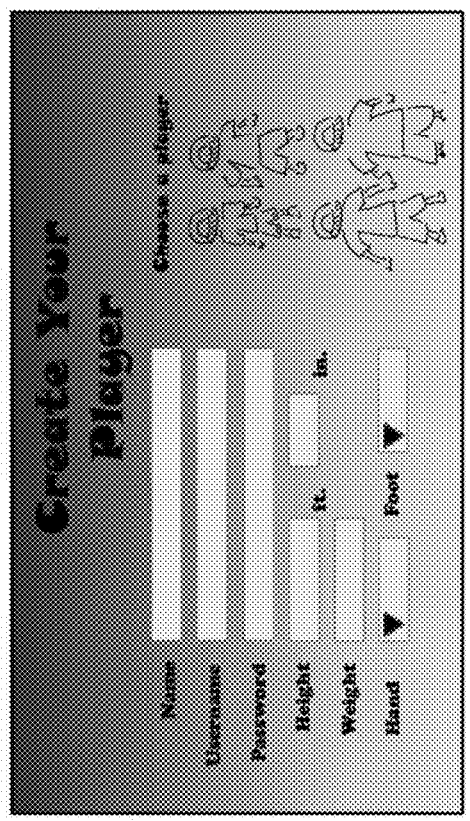
Figure 8C:
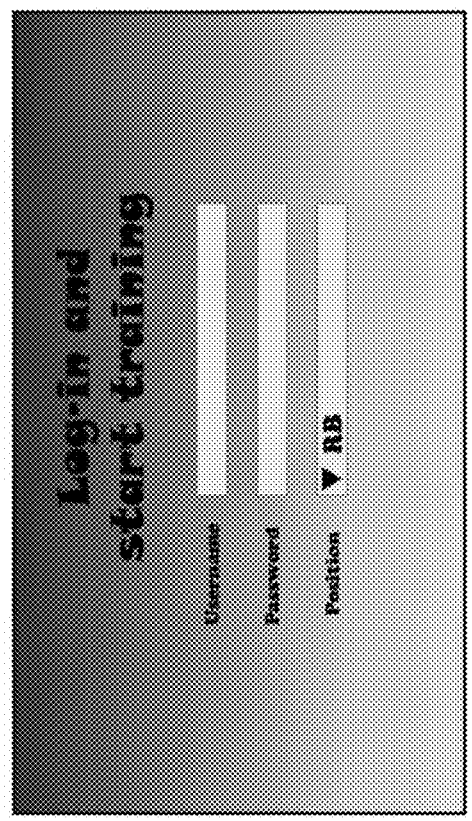
Figure 9A:
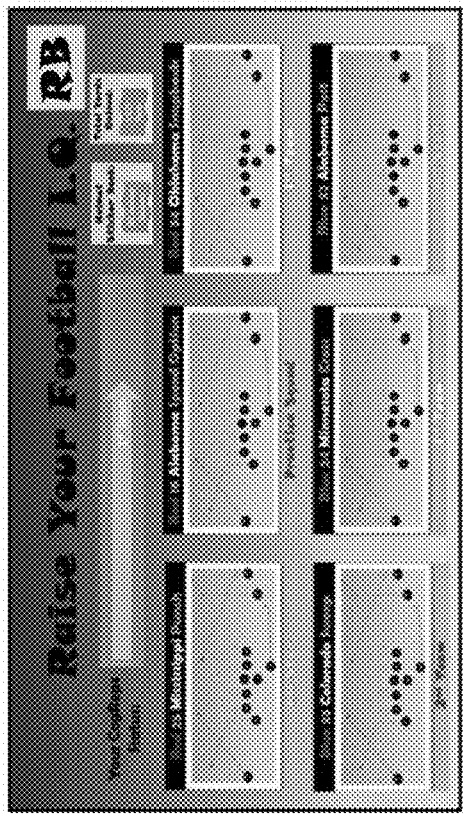
FIGS. 9A-9C depict a graphical user interface for a sequence of scenario section screens, according to an embodiment.
Figure 9B:
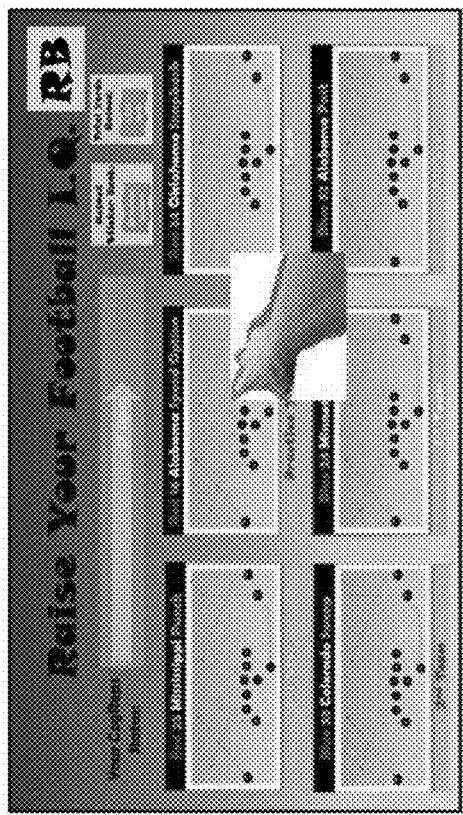
Figure 9C:
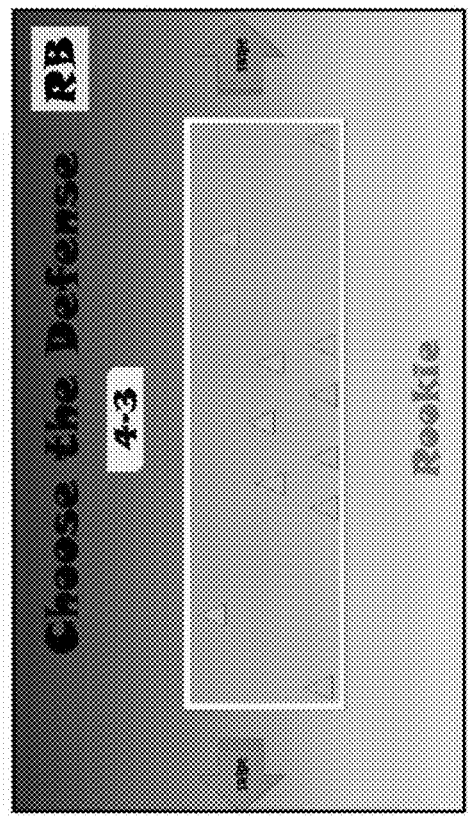
Figure 10A:
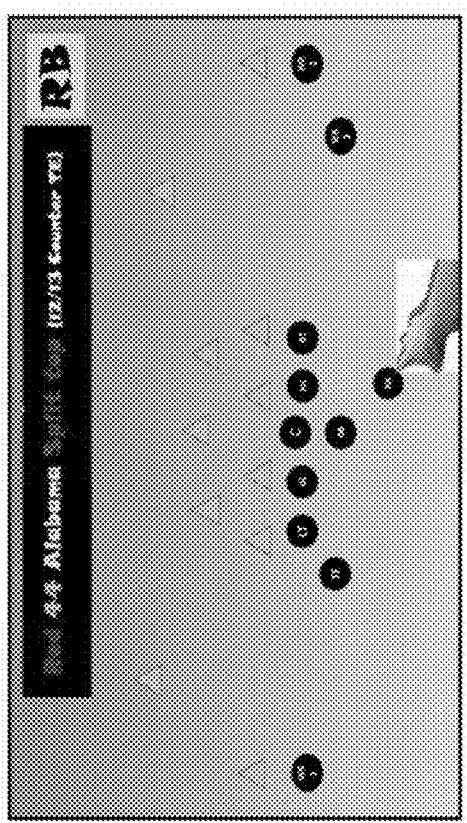
FIGS. 10A-10I depict a graphical user interface for a sequence of scenario display screens, according to an embodiment.
Figure 10B:
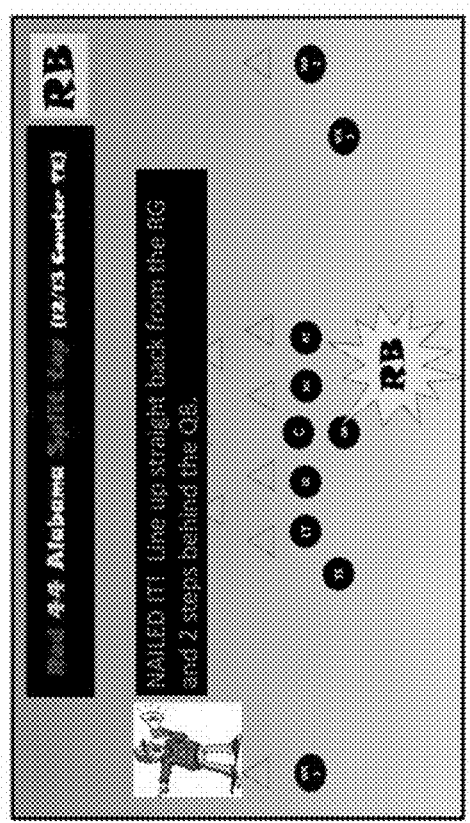
Figure 10C:
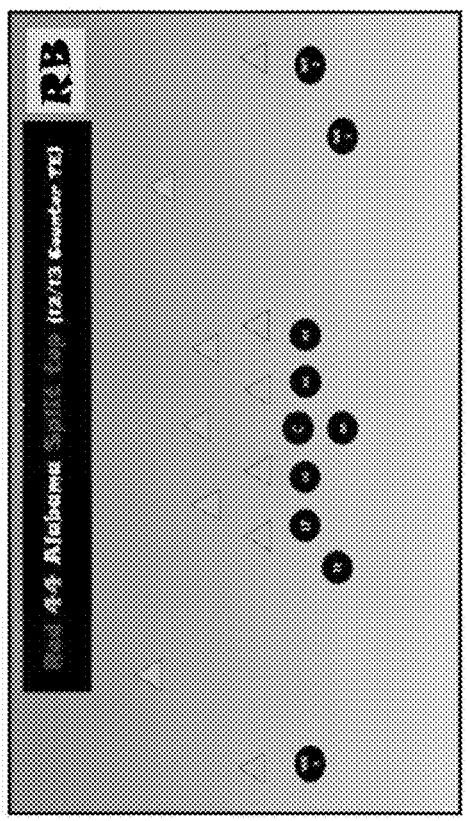
Figure 10D:
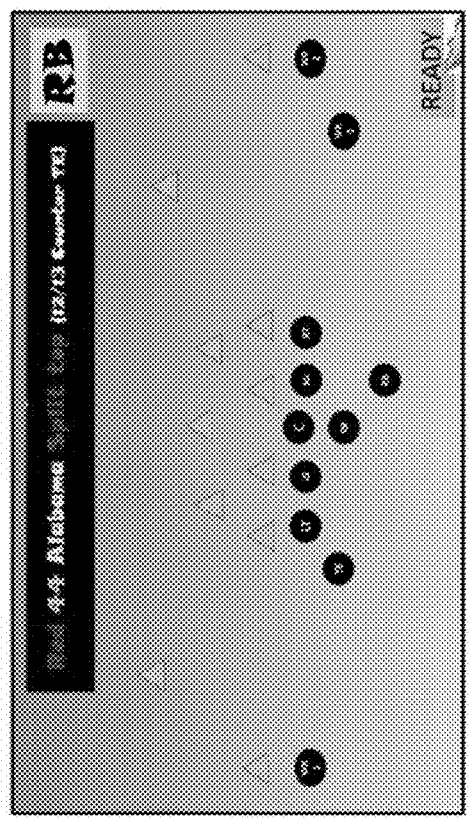
Figure 10E:
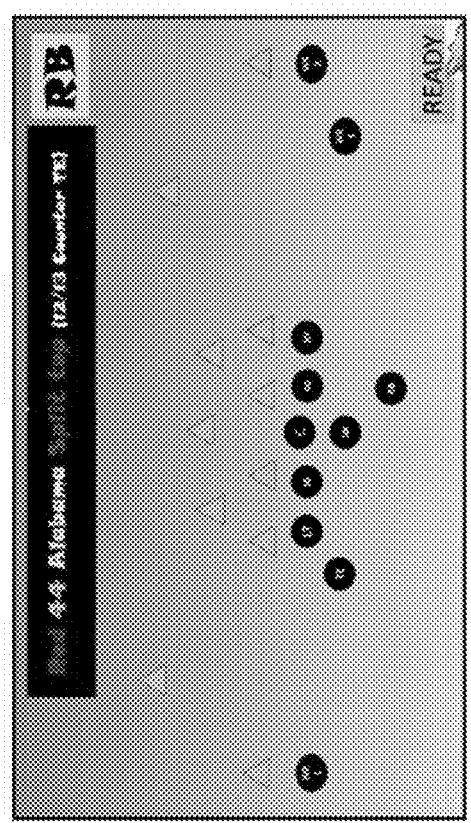
Figure 10F:
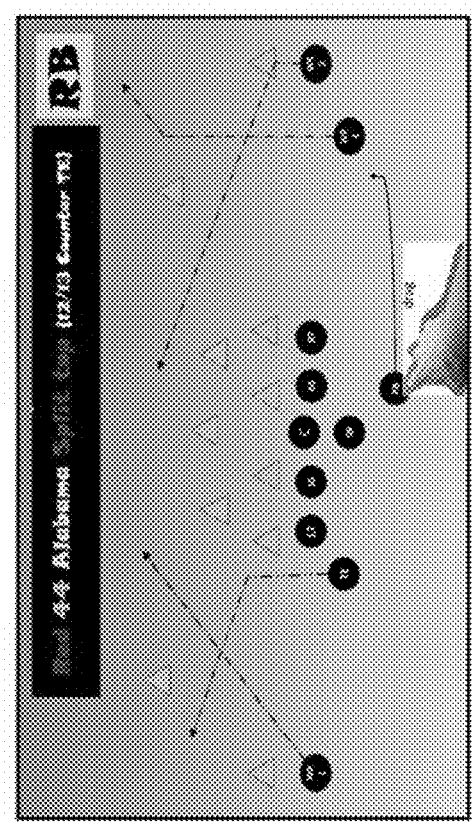
Figure 10G:
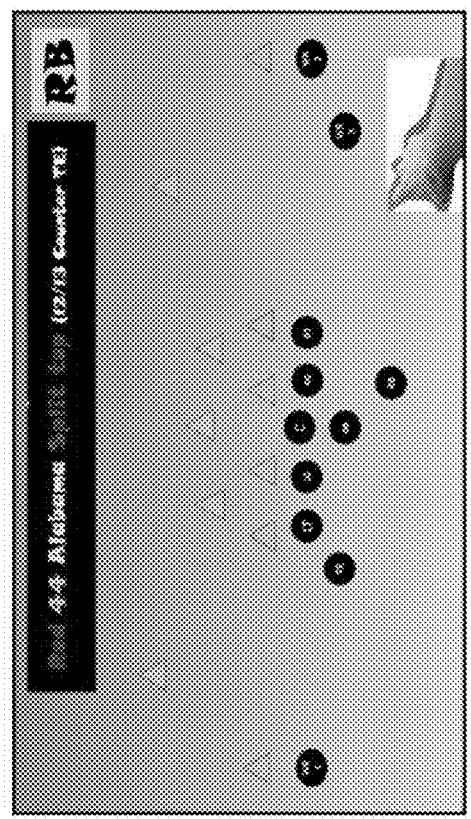
Figure 10H:
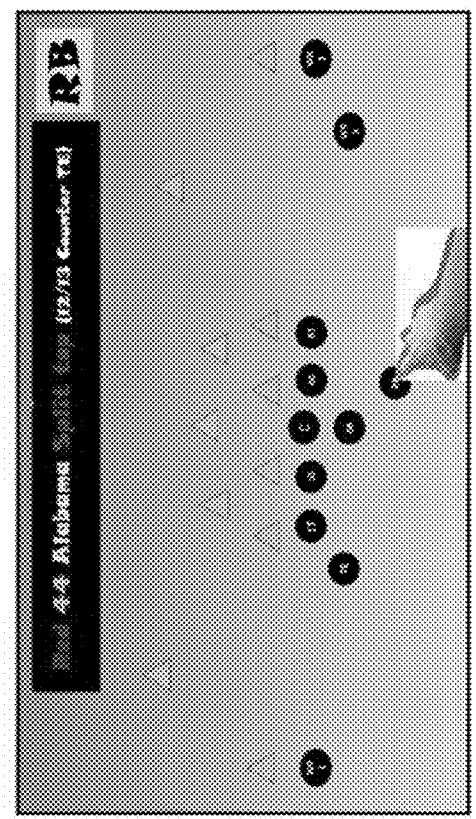
Figure 10I:
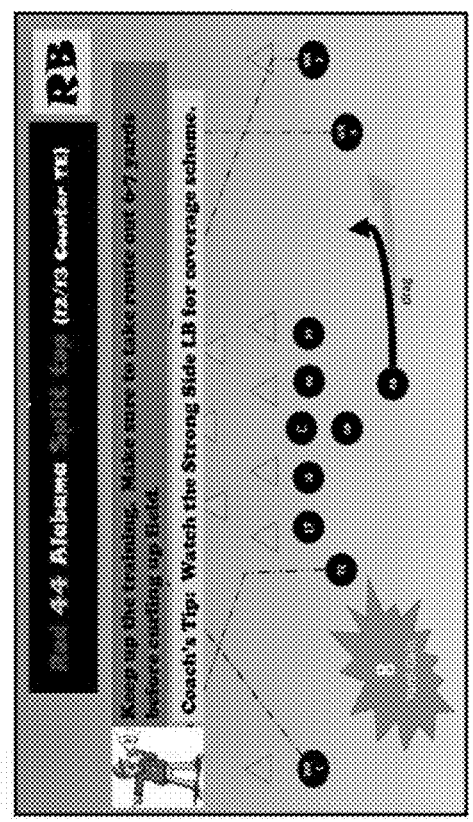
Figure 11B:
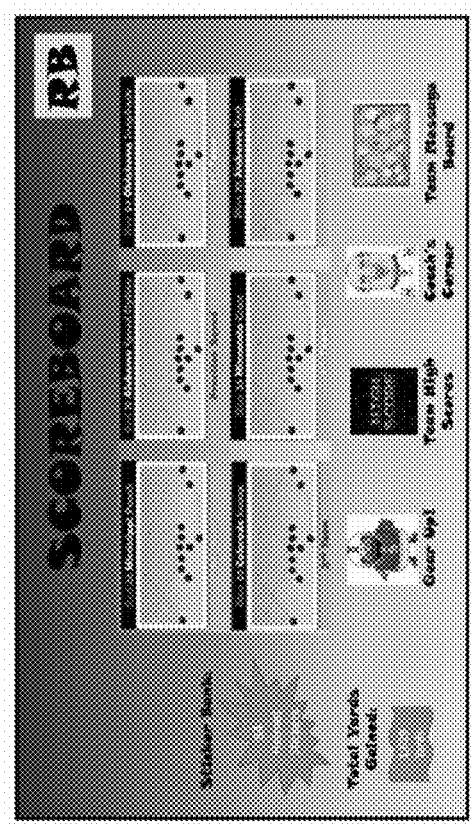
FIGS. 11A-11B depict a graphical user interface for a sequence of results screens, according to an embodiment.
Figure 11A:
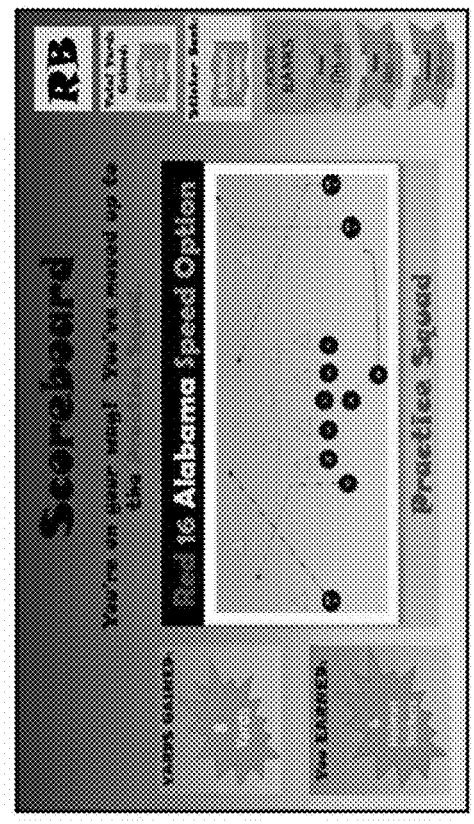

Turning now to FIG. 7, interface devices 300 can present a variety of screen options to a user. For example, the user may login via login screen 702, create, review, and/or edit scenarios via scenario setup screen 704, choose one or more a scenario via scenario selection screen 706, execute the one or more chosen scenarios via scenario display screen 708, and review and analyze results via results screen 710. Of course, the screens listed and depicted here are merely examples, and interface devices 300 can display more or fewer screens as required, each screen may also comprise subscreens as necessary to provide interactive functionality. In addition, while terms such as "display" and "screen" may imply visual output, it is understood that these screens can present information to the user via other means such as auditory, or haptic output.

In operation, simulation system 100 can implement a variety of training and testing modalities, examples of which that may be implemented in one or more embodiments are discussed in further detail below.

In non-limiting embodiments, simulation system 100 can provide a point-of-view (POV) simulation of a team playbook. In this modality, interface device 300 can display a view from the trainee's point of view, and the trainee can use input mechanisms 604 to follow the scenario 402 as generated from scenario script 310, stored in the library 308, and as optionally modified via scenario generation parameters 414. In embodiments, multiple interface devices 300 can be used by multiple trainees to provide a group simulation where multiple trainees can interact together on the same scenarios. In scenarios where trainees can assume multiple positions or roles, the group simulation can allow the trainees to fill all of the roles or a subset of roles. In embodiments, where there are more roles available than trainees to fill them, the scenario execution engine 206 can automatically perform the steps assigned to the missing roles.

In the POV simulation modality, actual trainee responses 318 can be used to track the accuracy of the trainee's comprehension of the playbook and staying with the scenario. The feedback and analysis engine 208 can produce and analyze data to be displayed via interface devices 300 to identify areas of improvement needed by a trainee, by the group, or by the subset of the group. The data can also be analyzed to determine trends and tendencies of individual trainees.

At certain points in the POV simulation modality (e.g. after a decision is made, mid-play, at the end of the play) data and notes can be accessed or visible via interface devices 300, providing instant feedback on things such as: what the trainee did correctly or incorrectly, and/or statistics of the trainee for a set period of time (e.g. you have cut left on 80% of the plays this year where you encountered the Middle Linebacker).

In embodiments, the POV simulation modality can incorporate trends and tendencies of one or more chosen opponents, allowing the trainee(s) to prepare for situations likely to be encountered in real-life experiences. In embodiments, the scenario execution engine 204 can utilize opponent data 320, either pre-loaded and/or manually updated and/or dynamically updated, in order to generate scenarios 402 that take into account an opponent's likely responses when determining reactions 410.

The scenario execution engine 204 can use detailed real-time statistics to create an interactive simulation experience so that when a trainee provides actual trainee responses 318 during the simulation, the reaction 410 to that decision is driven by the statistical tendencies of the opponent. In one sports-based example, if an opponent's tendencies indicate that when a trainee throws the ball to the receiver on the left side of the field, 95% of the time that pass is deflected, the scenario execution engine 204 may be more likely to respond by deflecting such a pass.

In addition to using established statistics, in embodiments, simulation system 100 can be altered to incorporate tendencies or trends determined by the trainee's coaching staff or other users. In embodiments, users can use scenario setup screen 704 to alter scenario generation parameters 414 in order to override the expectations and assumptions contained within opponent data 320. Continuing with the above example, although an opponent's tendencies indicate that when the trainee throws the ball to the receiver on the left side of the field, 95% of the time that pass is deflected, perhaps the coaching staff wants to alter their game plan to modify that expectation, thus changing the statistics that would be used to drive the user experience.

Interface devices 300 can also provide real-time information regarding specific scenario generation parameters 414 and opponent data 302. In embodiments, at certain points in the simulation (e.g. after a decision is made, mid-play, or at the end of a play) data and notes can be accessed or visible via interface devices 300, providing instant feedback on things such as, for example, the statistics of the opponent that were used to drive the interaction within the simulation or notes on how the coaching staff wants to tailor future plans.

The POV simulation modality can allow coaches and trainers to focus practice or other training on areas that need the most improvement, as well as identify general tendencies that can assist in creating game, execution, or lesson plans. The POV simulation modality can supplement live practice, walkthroughs, or game/performance recordings or film.

Further appreciation of the operation of simulation system 100 in the POV simulation modality can be had in light of the following example interactions in the context of a simulated playbook in order to assist in the training of football players. It is of course understood that these example interactions can be modified as desired in order to support additional modalities or contexts.

In an embodiment, a trainee can use interface device 300 to access login screen 702. After successfully logging in, the trainee can be directed to the scenario selection screen 706 where they may choose a position to play (which can determine the point-of-view used to render the scenario for the current session). The trainee can also be presented with a list of scenarios (for example, plays in a playbook) to choose from. Optionally, the trainee's current status for each scenario can be listed. The scenario selection screen 706 can also allow the trainee to select the opposing team's formation (e.g. defensive formation for an offensive player in a game, or offensive formation for a defensive player).

The scenario display screen 708 can present a 2D view of the playbook and formations, such as those set forth in FIGS. 8A-11B. The trainee can use an input mechanism 604 to move an avatar or other representation of player position to the assigned position based on the play called, and use the input mechanism 604 to submit their selection. The trainee can then use input mechanism 604 to indicate a location on the field where they believe their assignment is for the play called. For example, the trainee's assignment could have options such as: the defensive player they should block, the area on the field they should target as the end point of their route, the position on a defensive player (e.g. left shoulder, right shoulder) that the player should target for their block, the area of the field they should focus on to identify the player to block, as well as other potential assignments based on the scenario as specified by a trainer. The trainee can then control their avatar throughout the simulation of the play by dragging the avatar along the desired route, or by other input mechanisms.

Figure 12A:
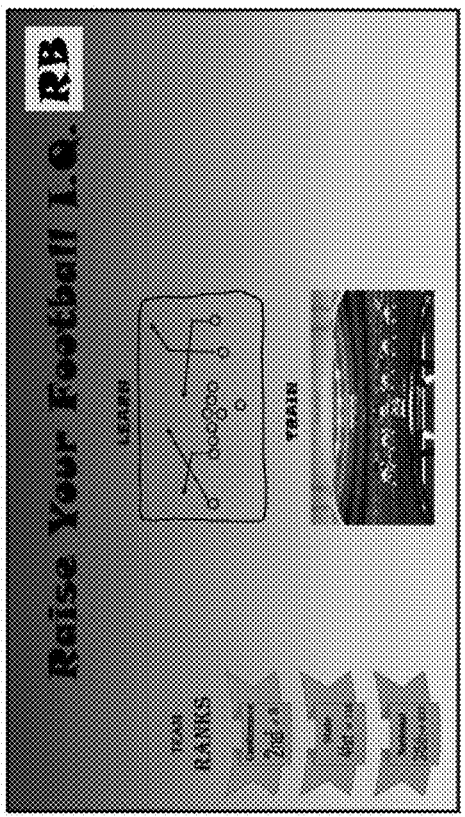
FIGS. 12A-12R depict a graphical user interface including scenario selection, scenario display, and results screens featuring a three-dimensional view, according to an embodiment.
Figure 12B:
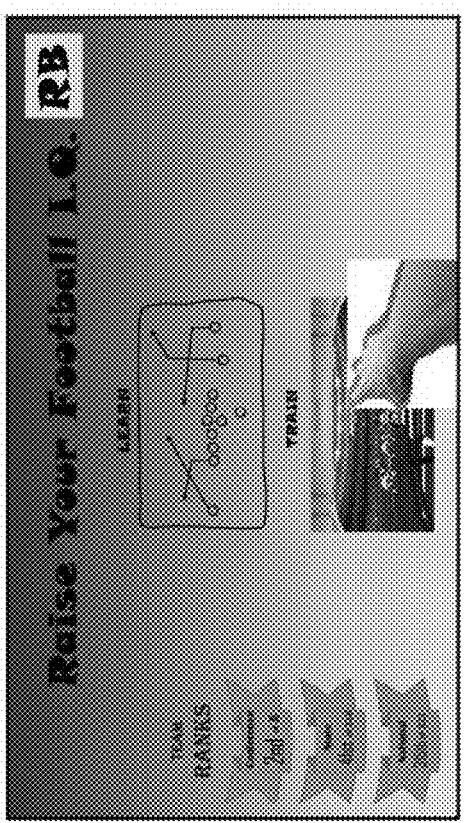
Figure 12C:
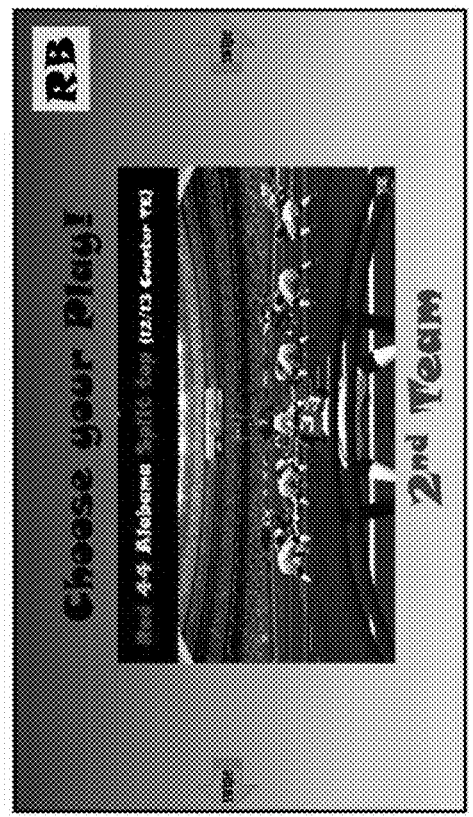
Figure 12D:
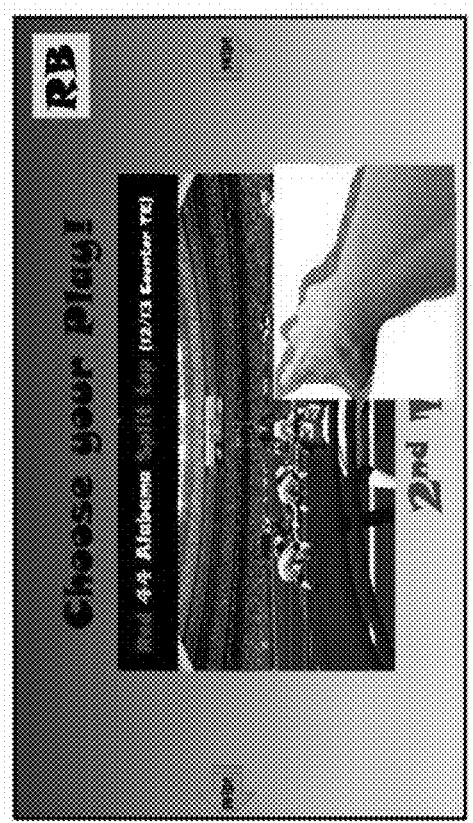
Figure 12E:
Figure 12F:
Figure 12G:
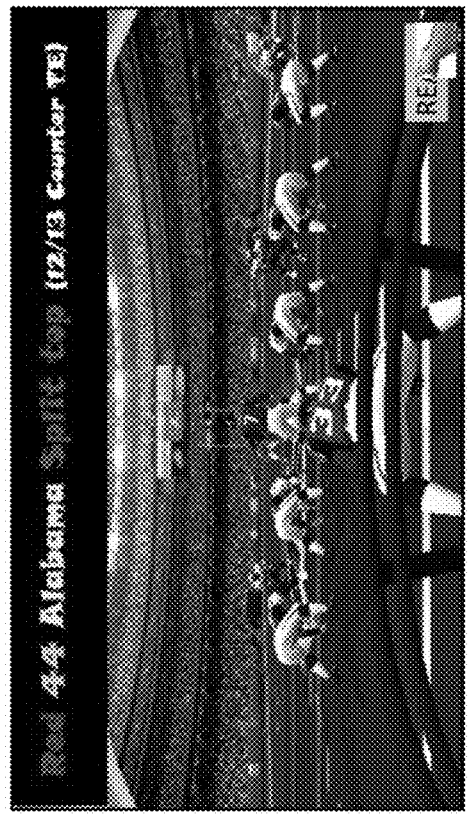
Figure 12H:
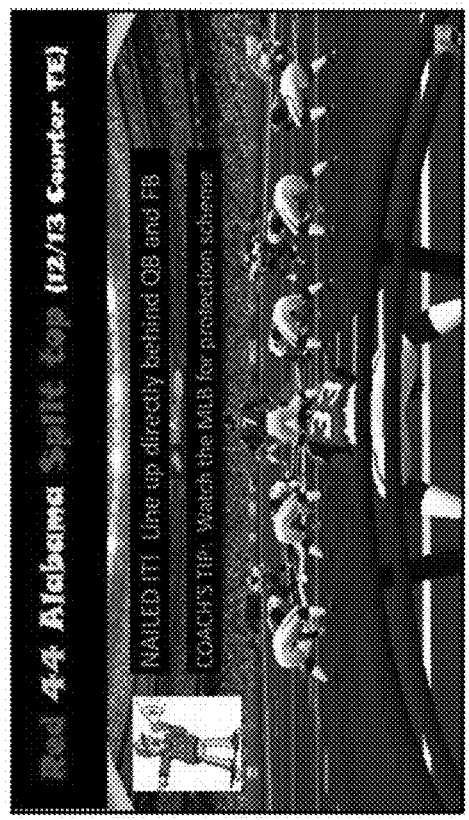
Figure 12I:
Figure 12J:
Figure 12K:
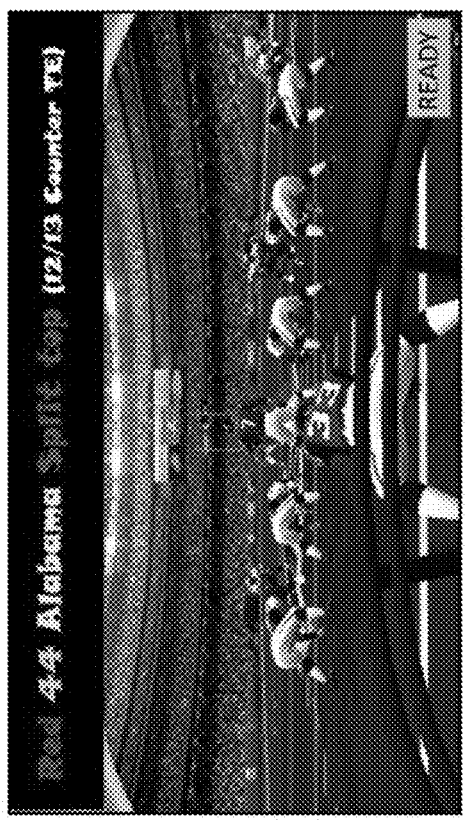
Figure 12L:
Figure 12M:
Figure 12N:
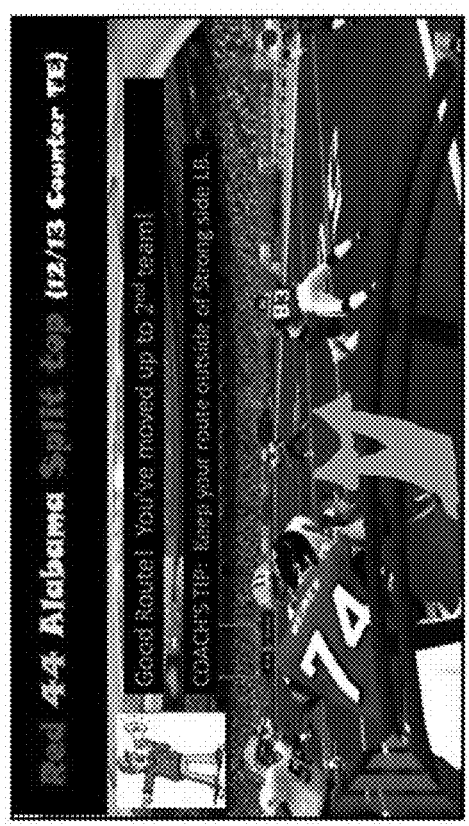
Figure 12O:
Figure 12P:
Figure 12Q:
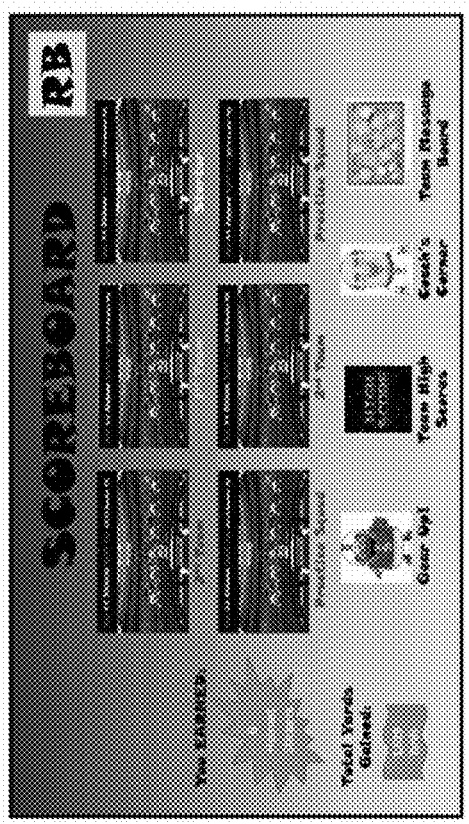
Figure 13A:
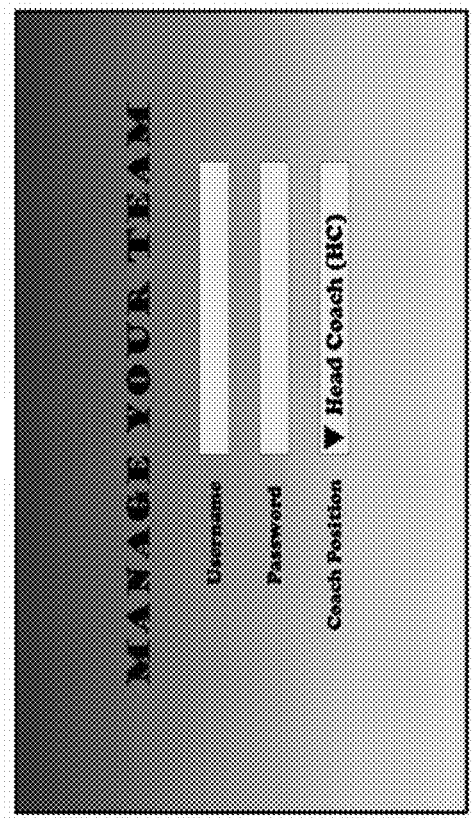
Figure 12R:
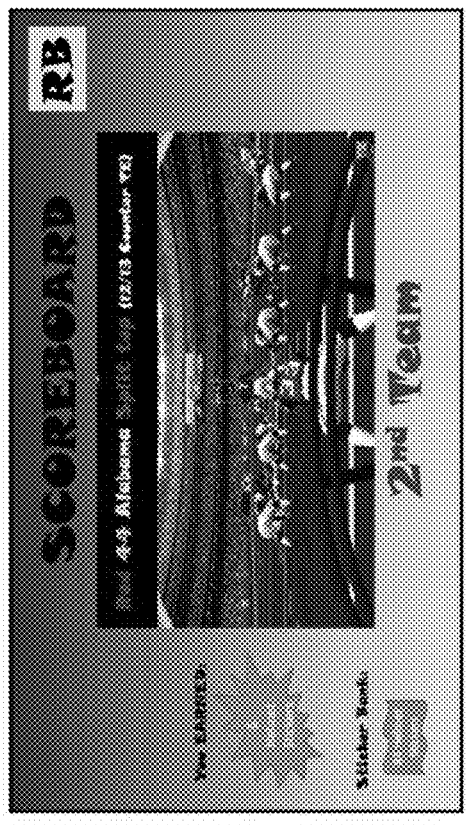
Figure 13B:
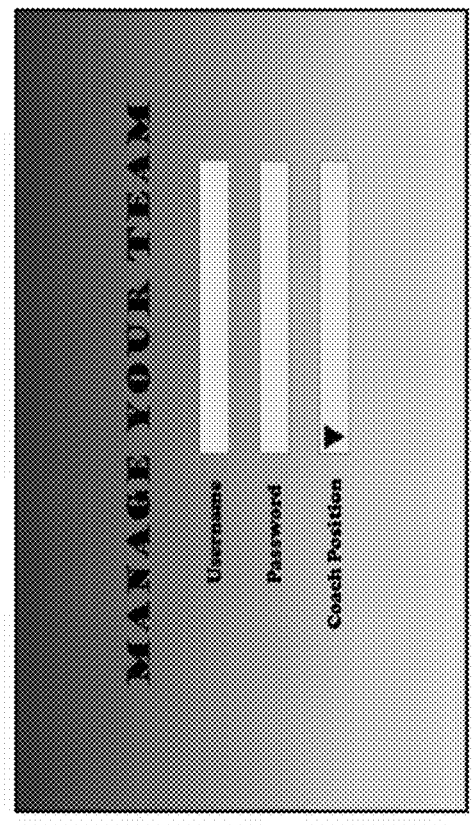
Figure 14A:
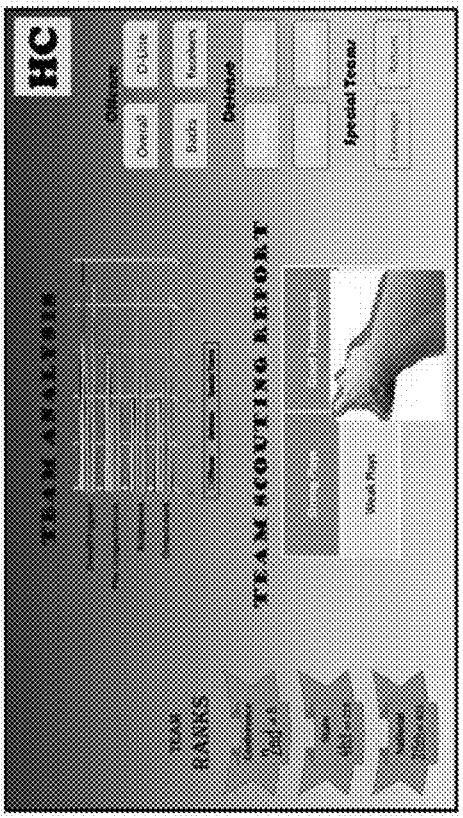
FIGS. 14A-14M depict a graphical user interface for a results screen, according to an embodiment.
Figure 14B:
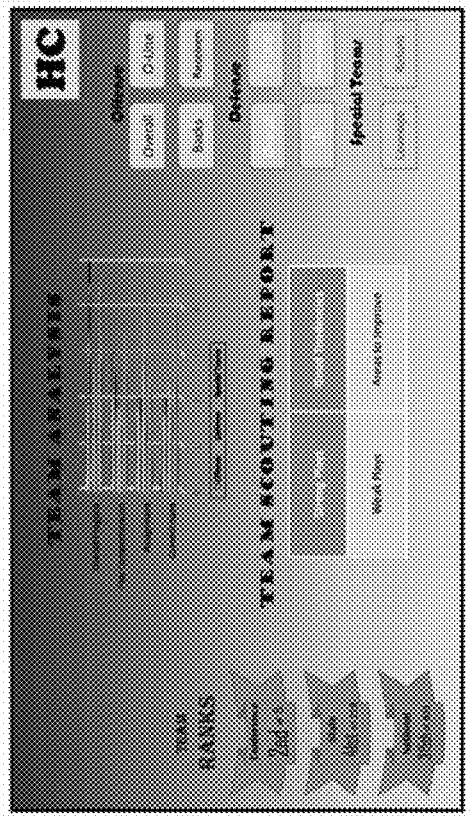
Figure 14C:
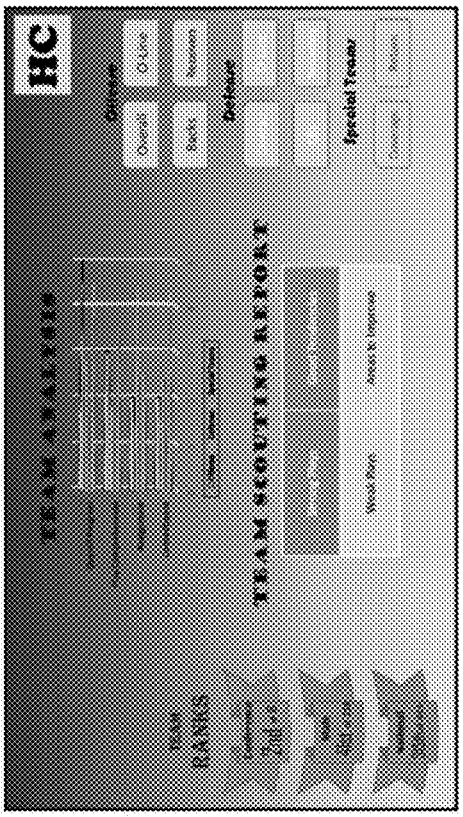
Figure 14D:
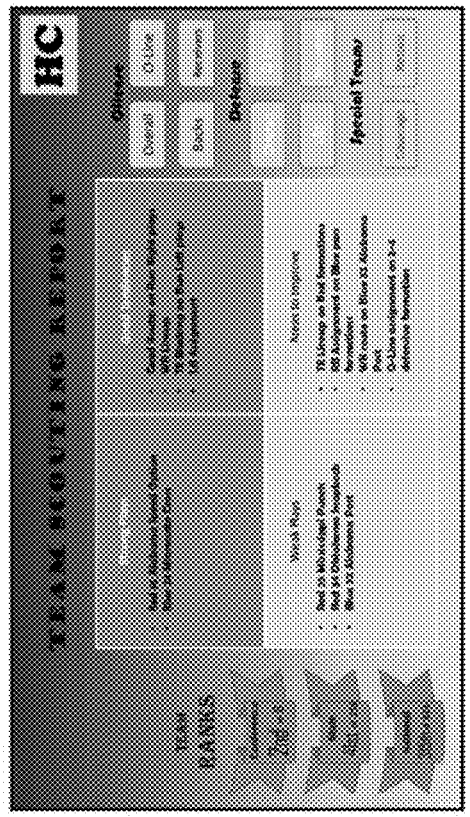
Figure 14E:
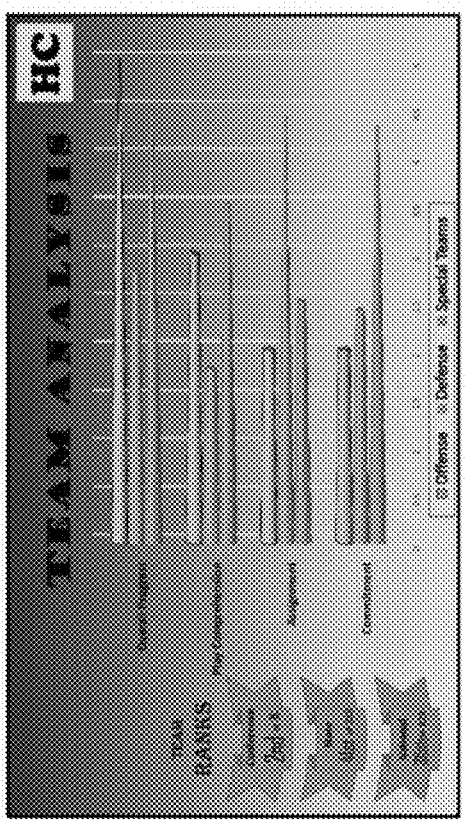
Figure 14F:
Figure 14G:
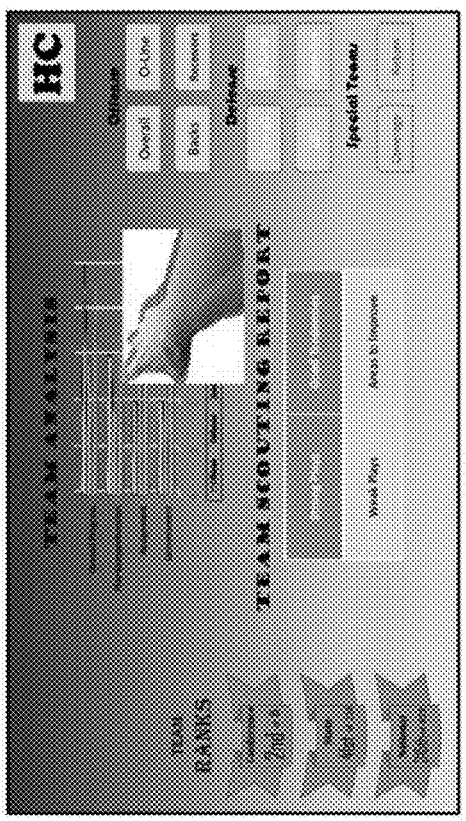
Figure 14H:
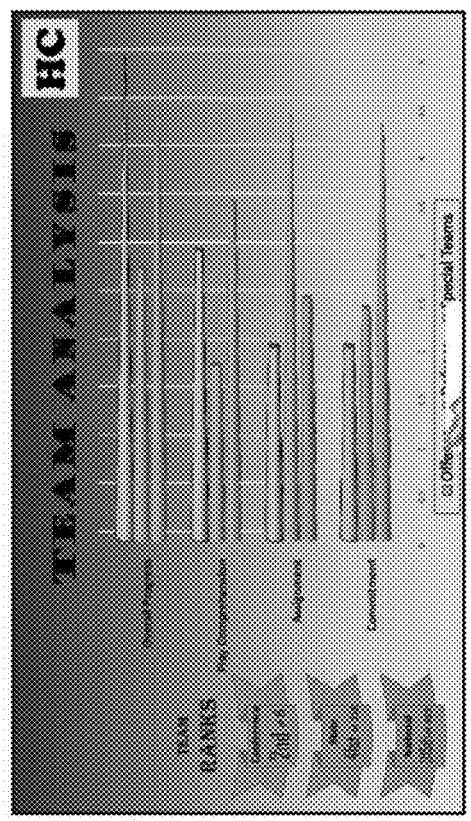
Figure 14I:
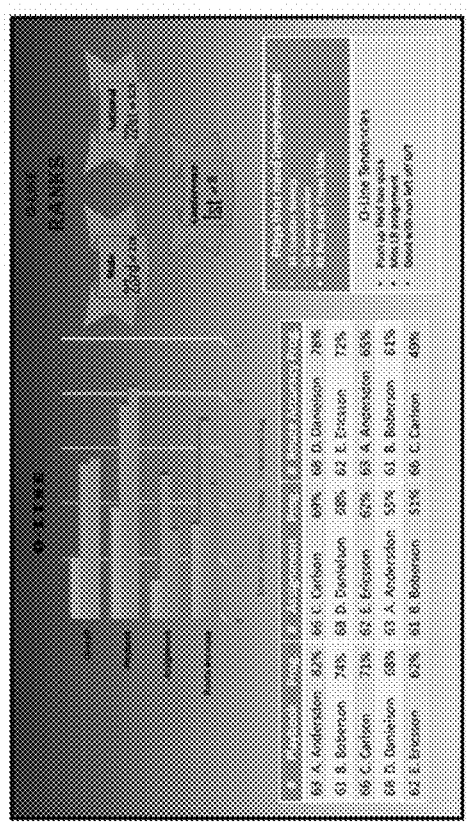
Figure 14J:
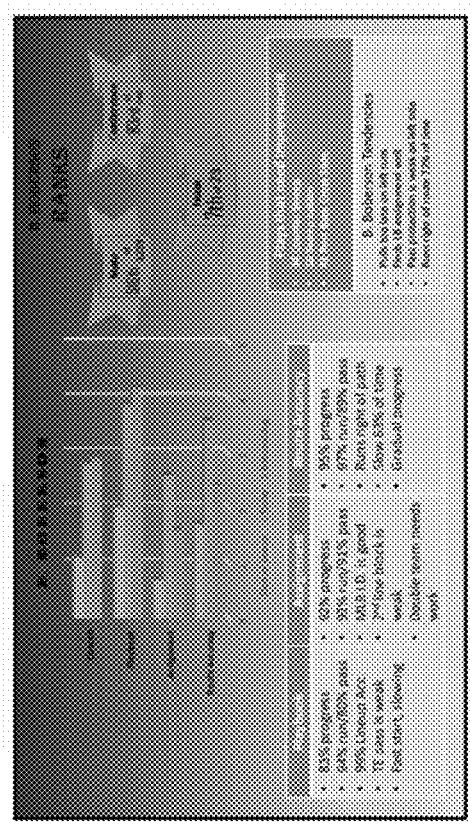
Figure 14K:
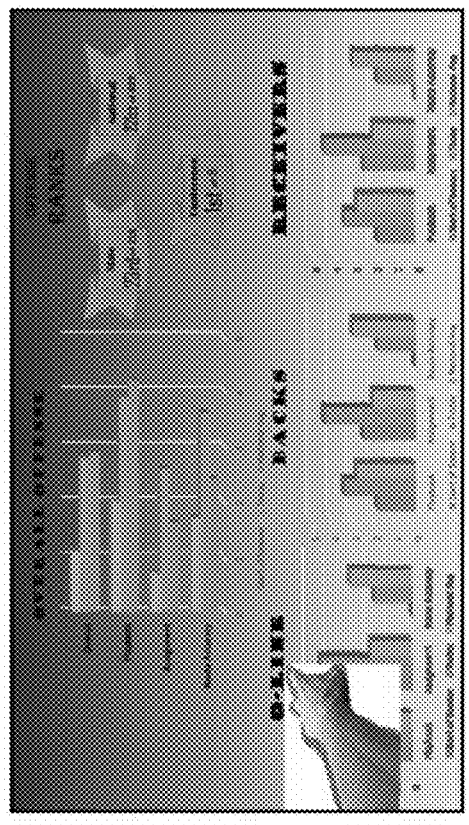
Figure 14L:
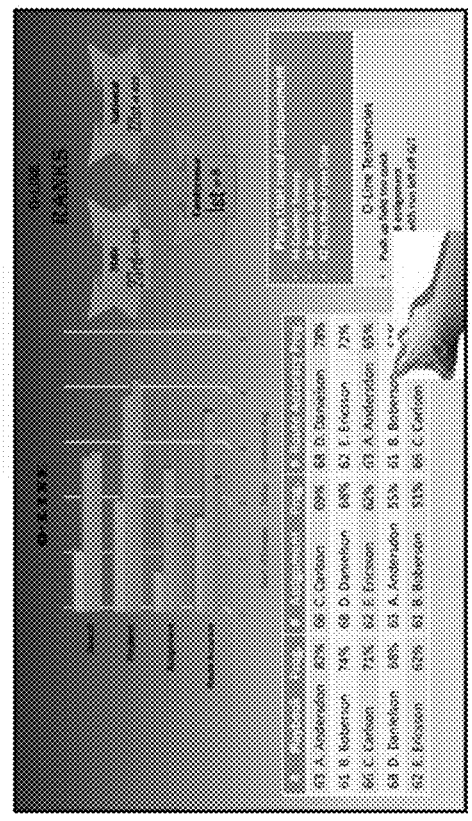
Figure 14M:
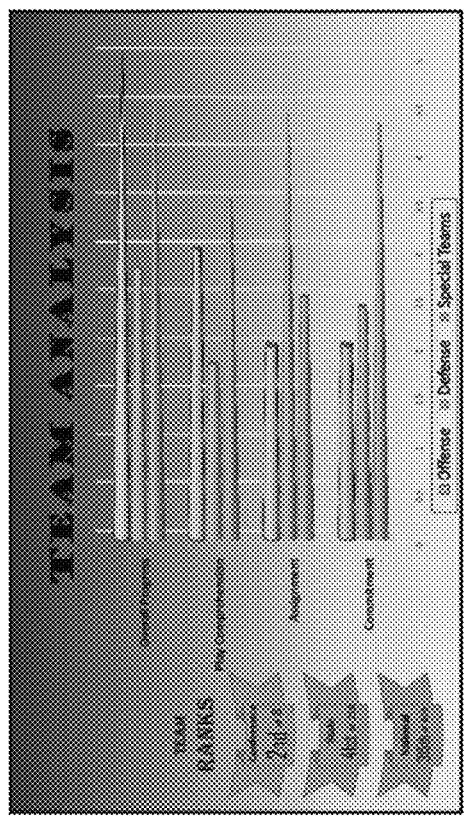

When the play is complete, the actual trainee responses 318 can by compared by the scenario execution engine 206. Results can be displayed on the scenario display screen 708 showing a visual representation of the route path the trainee followed during the simulated play, along with a separate visual representation on the same screen showing the expected route path (or expected trainee responses 314) based on how the scenario was specified. This visual representation will show the player the accuracy of their route compared to expected route path. The scenario display screen 708 may also allow the trainee to toggle between the 2D view and a 3D view, for example, when a scenario is not currently executing. Examples of a 3D view are depicted in FIGS. 12A-12R.

In embodiments, feedback and analysis engine 208 can store and report multiple football specific data items. For example, an accuracy rating (e.g. score) can be determined based on logic created using the proximity and timing of the route path, the proximity and timing of the trainee's selected lineup position, and the proximity and timing of the trainee's chosen assignment location. Trainee progress can be recorded and stored after each play is run and this progress can be reflected within the trainee's user interface. This data can also be reported to trainers via one or more result screens 710, such as those depicted in FIGS. 13A-14M.

In the exemplary football context, a trainee specific competency measure 306 can be the "Yards Gained" for each scenario. The yards gained can be displayed on scenario selection screen 706, scenario display screen 708, and results screens 710. The number of yards gained can be determined by logic created using the data related to position lineup, assignment recognition and route accuracy. Yards gained can be tracked cumulatively and reflected within screens throughout the application. Yards gained can be tracked and reflected separately for each position the trainee has logged in as, giving the trainee a view of progress status specific to the position they are logged in as.

In addition to "Yards Gained," trainees may also achieve "Helmet Stickers" or other achievement markers which are awarded at defined intervals based on specific logic created that will indicate the trainee has achieved a certain level of progress. Helmet Stickers can be used within an award system that can allow the player to obtain "extra items" within the user interface. Examples of these "extra items" could be new player equipment, or other additional content within the application.

Trainee progress can be used to create rankings of Trainees. These rankings can be based on various audiences such as, for example, Team, Conference, State, Region, National, and/or International.

Continuing in an exemplary football-based context, "coaches" may be users who are designated as a trainer type. After a coach logs in via the login screen 702 (see also FIGS. 13A-13B), the coach may be given the option to choose a coach profile, for example Head Coach, Defensive Coordinator, Offensive Coordinator, Offensive/Defensive Line coach, Quarterback coach, Defensive Back coach, Linebackers coach, etc. The selected coach profile can modify the selections available on the scenario setup screen 704 and results screen 710. For example, the coach profile may determine what data analysis is presented, the format of that data, and where on the screen the data will be reflected.

Via the scenario setup screen 704, the coach can have the ability to enter information (e.g. notes, comments, suggestions, instructions) in the user interface which can then be communicated to trainees via scenario selection screen 706 or scenario display screen 708. The scenario setup screen 704 can allow for the creation and modification of currently available plays and scenarios with controls to dictate lineup position, assignment area, route path, speed of route, etc. In additions, coaches can create messages in the coach interface that can be shared to trainees through interface devices 300 via a "message board."

In one embodiment and referring to FIGS. 13C-13F, the user is a coach who has the option of creating and managing a playbook or game plan using a play creating user interface 800. Once logged in, the coach user chooses from a library list of standard or common offensive plays from a menu list 802 within the user interface or display screen 804 by touching, dragging and dropping, or otherwise selecting the desired play (FIG. 13C). The coach user then chooses the defensive formation to oppose for the selected offensive play, as shown in FIG. 13D. The coach user can optionally modify the default structure of the selected offensive play to re-arrange specific positions and/or change the desired route path for specific positions, as also shown in FIG. 13D. This can be done by dragging a finger 807 or other device across the screen. This play creation process can also allow the user to add text in designated fields 806 or by creating a text field, which will be reflected in the Player's User Interface as "Coach's Tips", "Comments", "Game Plan Notes", or other similar designations.

The coach user can also have the option of creating or designing a defensive formation either by scratch or by starting from a standard or common defensive formation, similarly selected. When creating or designing the defensive formation, the coach user is able to designate one or more key positions to highlight as a focus for the player users to account for, as shown in FIG. 13E. This allows a coach to create a game plan against key opposing players, similar to how the scout teams are used in live practice to simulate the opposing team they expect to face.

Referring to FIG. 13F, after choosing a defensive formation and configuring the interaction with an offensive play, the coach user is optionally able to choose if the defense should move to the Left/Middle/Right side 808 of the line of scrimmage. This will drive the interaction of the opposing defensive players and force the player user to adapt and adjust to the motion of the defense.

In embodiments, creating the offensive play and opposing defensive formation can be managed within the same user interface and interaction, or alternatively can be managed separately in similar yet different user interfaces. The latter approach could allow for the coach user to create its desired offensive playbook once, and then going forward, the coach user simply chooses which defensive formations to set up to oppose the created offensive plays, and then modify the offensive play interaction specific to that defensive formation.

At any point during the offensive play or defensive formation creation, the coach user can initiate a simulation of the play as it is currently designed to see the current structure, allowing them to see where they may want to make further modifications. Once the coach user is satisfied with the play creation, the coach user can save it to their library, which may optionally be organized in such a way where custom or modified plays are separately saved or identified from the standard library of plays. The creation of offensive formations/plays, defensive formations, and offensive plays interacting with defensive formations can be saved and stored for future use.

This approach avoids the need for a coach user to build a play from scratch as most plays will be based off common formations and simply need to be tweaked to meet the desires of the coach user. It is expected this approach will allow the coach user to start with a play that is approximately 80% completed and only require the remaining 20% to make it their custom version.

In another embodiment of the invention, a game plan is created through the use of form submission. In this embodiment, a list of dynamic questions (i.e. the answer to one question may or may not determine what the following question will be) are presented to the coach user in the user interface to define the game plan and strategy of an upcoming competition or game. The questions would focus on key elements of offensive plays, defensive formations, scout team components, and/or strategy implemented by coach user. The answers to these questions would automatically create the base play formations, defensive formations, key focus opponent players, and optionally, Coach's Tips and Game Plan notes. From this point, the coach user simply makes the detailed changes, such as, but not limited to, changes to player positions, assignments and route paths, as described above.

In yet another embodiment, a game plan is created using an electronic version of a playbook. In this embodiment, the coach user has access to an electronic version (e.g. PDF, Word, etc.) of a playbook, such as a team playbook. The playbook can be uploaded to the user device, or can optionally dragged and dropped from another application, such as by dragging and dropping an illustrated play to a specified screen in the play creation user interface 800. Utilizing software that can analyze the illustrated play and determine or recognize what it is, the expected play is chosen from the pre-loaded library of plays to reflect the closest formation and routes that reflect the illustrated play the coach user introduced to the screen. From that point, the continued configuration of the formations and plays would be managed as outlined in the first scenario above. In yet another embodiment of play creation, video analysis software is utilized to determine an opposing team's tendencies to create a virtual scout team. In this embodiment, the coach user uploads, or accesses in some manner, one or more of an opponent's game film/video. Utilizing video analysis software, the opposing team and players' tendencies are determined and stored. Using the data captured by the video analysis software, expected scenarios are created using calculations to indicate the probability of a position/player interacting a certain way when engaged in a specified scenario. From that point, the continued configuration of the formations and plays would be managed as outlined in the first scenario above.

In embodiments, simulation system 100 can provide cognitive health tracking and training. Actual trainee responses 318 stored in data storage engine 202 can allow the determination of a baseline to trainee in terms of their cognitive function and health. Over time, feedback and analysis engine 208 can detect the cognitive changes. In embodiments, this modality could allow for more specific detection and tracking of acute and/or chronic brain trauma such as a concussion, or other brain-related injuries such as CTE.

In embodiments, the cognitive health tracking and training modality could be used to determine expectations of the cognitive capabilities of individual users/players. This would allow coaching or training staff to design training plans and scenarios focused on the specific trainee's ideal learning environment and approach based on their cognitive capabilities. Scientifically designed interactions can be used to stimulate specific cognitive functions, for example training could be tailored to improve reaction times, decision-making and/or spatial awareness.

In embodiments, access to simulation system 100 can be provided on a number of bases. For example, a free version may include a limited set of pre-defined scenarios. In embodiments, a subscription may be required to gain access to a specific interface or interfaces that will contain a specific set of scenarios, along with other subscription-specific content. Additional premium content can be made available to subscribers who sign up for said content. Additional premium content can include, for example, "expert" tips/video, or embedded video/film. In certain embodiments, additional or premium content can include situational scenarios, such as, for example, and referring specifically to football, $3^{rd}$ down and 10 yards to gain, $4^{th}$ down and 3 yards or less to gain, special teams, "flea flicker", "hail mary", or the like and combinations thereof with different field location, game time, and/or score options.

Simulation system 100 may include dynamic advertising. Examples of advertising could include of brand placement on the various screens, ad interstitials, video interstitials, reward interstitials, etc. Access to partner websites can also be made available through simulation system 100.

Use of the simulation system 100 may be tracked. This data can be used to create loyalty programs with partners whereby the user can achieve stated benefits at specific intervals.

Figure 15:
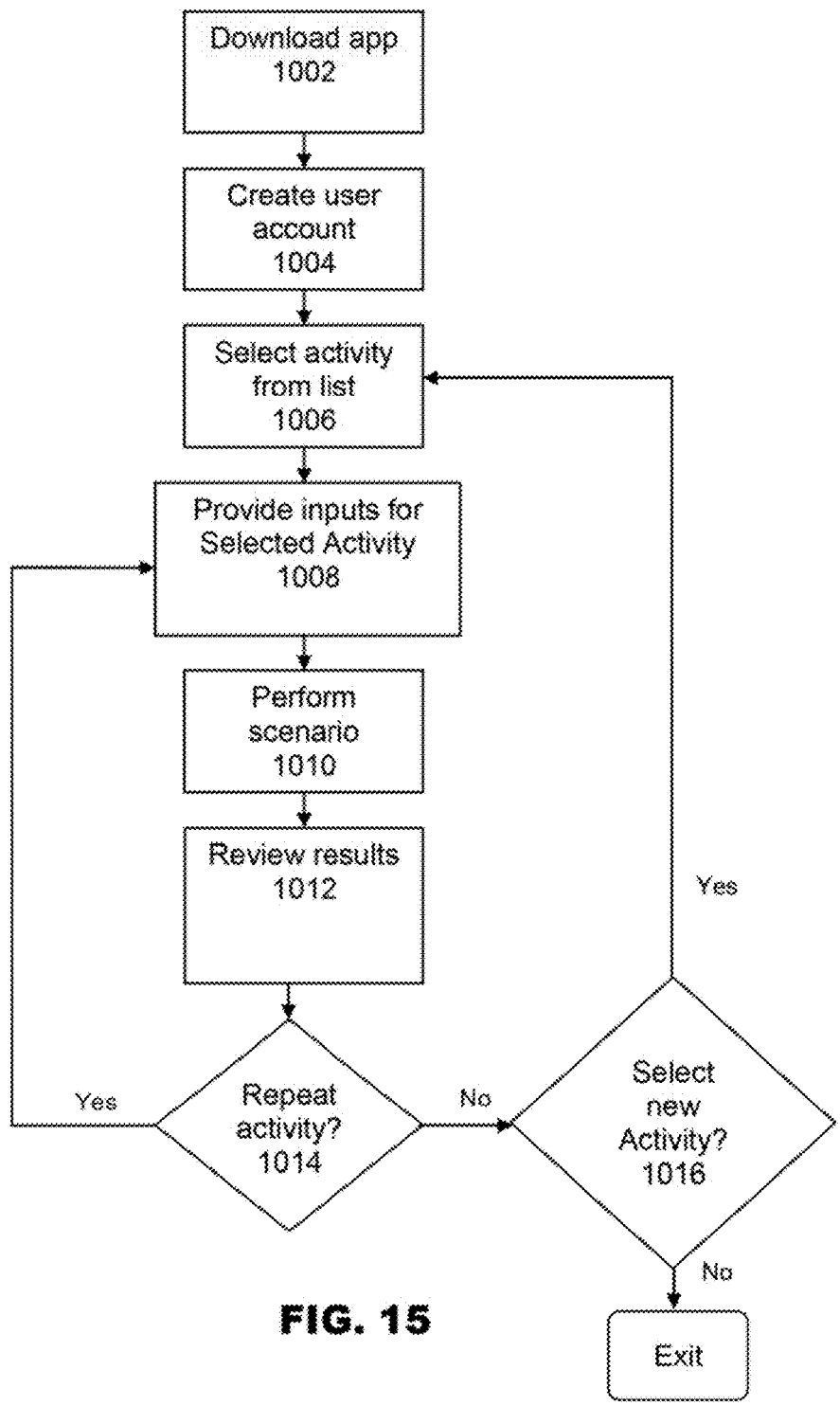
FIG. 15 is flowchart depicting operation of a multimodality system, according to an embodiment.

In another embodiment of the invention, a simulation system 1000 comprises simulations of a plurality of activities available to the user. For example, and as depicted in the flowchart of FIG. 15, at 1002 the application is downloaded or streamed to a user device as described with respect to other embodiments. A user account is created at 1004, as described previously, and can include, for example, indicating player/avatar features such as, for example, right/left foot/hand designations, height, weight, age, build, and/or a variety of other inputs. Once the user has created an account (or logs back in if account has previously been created), at 1006, the user chooses an activity, such as a sport (e.g. football, soccer, or basketball) from a menu on the user interface. Depending on the activity selected, at 1008, the user enters or chooses inputs specific to the selected activity. For example, if football is selected, the user can select from any of a variety of team profile (7 vs. 7, 9 vs. 9, 11 vs. 11, etc.), position, play (common/standard language), opposing defensive or offensive position, speed, 2D vs. 3D, and the like. If soccer is selected, such inputs can include team profile, position, formation (4-3-3, 4-4-2, 5-3-1, etc.), opposing formation, speed, 2D vs. 3D, and the like. If basketball is selected, such inputs can include position, offensive formation (2 on perimeter/3 across baseline, 3 perimeter/2 on blocks, etc.), defensive formation (zone vs. man-on-man, full court press, etc.), speed, 2D vs. 3D, and the like.

Once all inputs have been selected, at 1010, the scenario is executed (game play). Once finished, at 1012, the user can review the performance and/or feedback. The user is then prompted at 1014 to decide whether to repeat the activity. If the answer to repeat the activity or scenario is yes, the user is then taken back to the specific scenario for re-execution, with the option to enter different inputs. If the answer to repeat the activity is no, the user is then prompted with the option to select a new activity at 1016. If the answer to the option of selecting a new activity is yes, the user is then prompted to select from the available activities at 1006. If the answer to the option of selecting a new activity is no, the user can log out, review performance history, data, and/or profile, and the application is exited either manually or automatically after a period of non-activity.

The computer, computing device, tablet, smartphone, server, and hardware mentioned herein can be any programmable device(s) that accepts analog and digital data as input, is configured to process the input according to instructions or algorithms, and provides results as outputs. In an embodiment, the processing systems can include one or more central processing units (CPUs) configured to carry out the instructions stored in an associated memory of a single-threaded or multi-threaded computer program or code using conventional arithmetical, logical, and input/output operations. The associated memory can comprise volatile or non-volatile memory to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the claims.

In other embodiments, the processing system or the computer, computing device, tablet, smartphone, server, and hardware, can include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware that execute an operating system, system programs, and application programs, while also implementing the engine using multitasking, multithreading, distributed processing where appropriate, or other such techniques.

Accordingly, it will be understood that each processing system can be realized in a variety of physically realizable configurations, and should generally not be limited to any particular implementation exemplified herein, unless such limitations are expressly called out. In addition, a processing system can itself be composed of more than one engine, sub-engines, or sub-processing systems, each of which can be regarded as a processing system in its own right. Moreover, in embodiments discussed herein, each of the various processing systems can correspond to a defined autonomous functionality; however, it should be understood that in other contemplated embodiments, each functionality can be distributed to more than one processing system. Likewise, in other contemplated embodiments, multiple defined functionalities can be implemented by a single processing system that performs those multiple functions, possibly alongside other functions, or distributed differently among a set of processing system than specifically illustrated in the examples herein.

Various embodiments of devices, systems and methods have been described herein. These embodiments are given only by way of example and are not intended to limit the scope of the invention. It should be appreciated, moreover, that the various features of the embodiments that have been described can be combined in various ways to produce numerous additional embodiments. Moreover, while various materials, dimensions, shapes, configurations and locations have been described for use with disclosed embodiments, others besides those disclosed can be utilized without exceeding the scope of the invention.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A cognitive training and evaluation system capable of simulating a scenario created, edited, or managed by a trainer to be executed by a trainee, comprising:
    a simulation server including—
        a data storage engine configured to store a library of one or more scenario scripts created, edited, or managed by the trainer, each of the one or more scenario scripts comprising one or more initial actions of the trainee, reactions of the trainee, and expected trainee responses,
        a scenario generation engine configured to generate a scenario based on one of the one or more scenario scripts and one or more scenario generation parameters,
        a scenario execution engine configured to execute the scenario by determining an initial status based on the one or more initial actions of the trainee;
    at least one interface device in communication with the simulation server, the at least one interface device comprising a portable handheld device, wherein the at least one interface device is configured to allow the trainee to interact with the simulation server;
    instructions that, when executed on the simulation server, cause the simulation server to iteratively:
        receive a response from the interface device corresponding to an input from the trainee through the portable handheld device,
        determine a reaction and an updated status based on the received response and the scenario,
        update the scenario based on the reaction and the updated status, and
        communicate the updated status and updated scenario to the interface device; and
    instructions, that when executed on the interface device, cause the interface device to iteratively:
        receive one or more statuses and the scenario executed by the scenario execution engine from the simulation server;
        render a simulation based on the one or more statuses and the scenario;
        provide an output via the portable handheld device to the trainee in the form of at least one of a visual, auditory, or haptic output;
        receive a response from the trainee; and
        communicate the response to the simulation server for determining the reaction and the updated status,
    wherein the system is configured such that the trainer can access, via a first login and first access privilege on the at least one interface device, the library stored in the data storage engine of the simulation server to create or provide the one or more scenario scripts, and the trainee can access, via a second login and second access privilege on the at least one interface device, the one or more scenario scripts for execution, wherein the first access privilege is different than the second access privilege,
    wherein the input from the trainee provided via the portable handheld device includes at least one of a visual, auditory, or haptic input corresponding to an actual trainee response, and
    wherein each scenario includes at least one opponent, and a performance of the at least one opponent in each iteration of the scenario is determined by a response from the trainee in a previous iteration of the scenario.

2. The system of claim 1, wherein the simulation server is coupled to a computing platform including computing hardware of at least one processor, data storage, an operating system implemented on the computing hardware.

3. The system of claim 1, wherein the data storage engine is further configured to store actual trainee responses.

4. The system of claim 1, wherein the simulation server further implements a feedback and analysis engine configured to provide statistics and reports to the interface device.

5. The system of claim 1, wherein the data storage engine is further configured to store user information, comprising user names, passwords, and access privileges.

6. The system of claim 1, wherein the data storage engine is further configured to store opponent data.

7. The system of claim 6, wherein the scenario execution engine determines a reaction based on the opponent data.

8. The system of claim 1, wherein the data storage engine is further configured to store one or more trainee specific competency measures.

9. The system of claim 8, wherein the scenario execution engine determines a reaction based on at least one of the one or more trainee specific competency measures.

10. The system of claim 1, wherein the interface device is further configured to allow the trainer to edit one or more scenario scripts in the library.

11. The system of claim 10, wherein the interface device is further configured to allow the trainer to restrict the trainee's access to one or more scenario scripts in the library.

12. The system of claim 1, wherein the interface device is further configured to allow the trainee to select a scenario script to execute.

13. The system of claim 1, wherein the interface device is further configured to allow the trainer to specify one of the one or more scenario generation parameters.

14. The system of claim 1, wherein the scenarios can include knowledge test questions.

* * * * *